(12) United States Patent
Yoscovich et al.

(10) Patent No.: US 11,791,768 B2
(45) Date of Patent: Oct. 17, 2023

(54) SYSTEMS AND METHODS TO INCREASE THE RELIABILITY AND THE SERVICE LIFE TIME OF PHOTOVOLTAIC (PV) MODULES

(71) Applicant: Solaredge Technologies Ltd., Herzeliya (IL)

(72) Inventors: Ilan Yoscovich, Ramat Gan (IL); Liron Har-Shai, Tel Mond (IL); Amir Grossberg, Tel Aviv (IL); Matan Atias, Tel Aviv (IL)

(73) Assignee: Solaredge Technologies Ltd., Herzeliya (IL)

( * ) Notice: Subject to any disclaimer, the term of this patent is extended or adjusted under 35 U.S.C. 154(b) by 93 days.

(21) Appl. No.: 17/481,996

(22) Filed: Sep. 22, 2021

(65) Prior Publication Data

US 2022/0037880 A1    Feb. 3, 2022

Related U.S. Application Data

(63) Continuation of application No. 16/405,235, filed on May 7, 2019, now Pat. No. 11,159,016.

(60) Provisional application No. 62/669,499, filed on May 10, 2018.

(51) Int. Cl.
| | | |
|---|---|---|
| *H02S 40/30* | (2014.01) | |
| *H02J 1/08* | (2006.01) | |
| *H02J 3/40* | (2006.01) | |
| *H02J 3/46* | (2006.01) | |
| *H02J 3/38* | (2006.01) | |
| *H02M 7/5395* | (2006.01) | |
| *H02M 1/32* | (2007.01) | |

(52) U.S. Cl.
CPC ............. *H02S 40/30* (2014.12); *H02J 1/08* (2013.01); *H02J 1/082* (2020.01); *H02J 3/381* (2013.01); *H02J 3/40* (2013.01); *H02J 3/466* (2020.01); *H02J 2300/24* (2020.01); *H02M 1/322* (2021.05); *H02M 7/5395* (2013.01)

(58) Field of Classification Search
CPC .... H02J 3/381; H02J 1/08; H02J 1/082; H02J 3/385; H02M 1/322
See application file for complete search history.

(56) References Cited

U.S. PATENT DOCUMENTS

| | | |
|---|---|---|
| 2010/0286840 A1 | 11/2010 | Powell et al. |
| 2013/0063119 A1 | 3/2013 | Lubomirsky |
| 2013/0194706 A1 | 8/2013 | Har-Shai et al. |
| 2013/0235628 A1 | 9/2013 | Dong et al. |

(Continued)

FOREIGN PATENT DOCUMENTS

| | | |
|---|---|---|
| CN | 104242811 A | 12/2014 |
| CN | 204131141 U | 1/2015 |

(Continued)

OTHER PUBLICATIONS

Jul. 15, 2019—European Search Report—EP 19172253.7.
Mar. 15, 2021—EESR—EP 20206916.7.

*Primary Examiner* — Rafael O De Leon Domenech
(74) *Attorney, Agent, or Firm* — Banner & Witcoff, Ltd.

(57) ABSTRACT

An apparatus may determine a parameter related to a voltage value at a midpoint terminal of a system power device, and may adjust a voltage applied to a second terminal of the system power device based on the parameter and a reference value. The second terminal may be different from the midpoint terminal.

20 Claims, 15 Drawing Sheets

(56) References Cited

U.S. PATENT DOCUMENTS

| | | | |
|---|---|---|---|
| 2015/0288296 A1 | 10/2015 | Kidera et al. | |
| 2016/0254672 A1* | 9/2016 | Yoscovich | H02J 3/46 307/77 |
| 2018/0011149 A1 | 1/2018 | Tsai et al. | |
| 2018/0083570 A1 | 3/2018 | Sella et al. | |
| 2020/0177100 A1 | 6/2020 | Wang et al. | |

FOREIGN PATENT DOCUMENTS

| | | |
|---|---|---|
| CN | 104467018 A | 3/2015 |
| CN | 106961118 A | 7/2017 |
| CN | 108011583 A | 5/2018 |
| EP | 2256918 A2 | 12/2010 |
| WO | 2014152458 A2 | 9/2014 |

\* cited by examiner

SYSTEMS AND METHODS TO INCREASE THE RELIABILITY AND THE SERVICE LIFE TIME OF PHOTOVOLTAIC (PV) MODULES

CROSS REFERENCE TO RELATED APPLICATIONS

The present application is a continuation of U.S. application Ser. No. 16/405,235, filed May 7, 2019, which claims priority to U.S. provisional application Ser. No. 62/669,499, filed May 10, 2018, entitled "Systems and methods to increase the reliability and the service life time of photovoltaic (PV) modules." The contents of which are incorporated herein by reference in their entireties.

BACKGROUND

A possible way of reducing the costs of photovoltaic systems is to increase the reliability and the service lifetime of photovoltaic (PV) modules. A PV module failure may be caused by an effect that degenerates the module power that may or may not be reversed by normal operation and/or creates a safety issue. The underperformance of silicon wafer-based PV systems may be due to an effect termed "polarization" where n-type cells over time developed voltage induced power degeneration at a positive polarity from cells to ground. Conversely, several different module types with p-type cells may degenerate in negative polarity from cells to ground. Power losses in PV modules may be more pronounced the higher the voltage is. In crystalline silicon wafer-based PV modules, a reversible polarization effect may be applied for p-type and n-type cells, at negative and positive voltages, respectively.

SUMMARY

The following summary is a short summary of some of the inventive concepts for illustrative purposes only and is not intended to limit or constrain the features and examples in the detailed description. One skilled in the art will recognize other novel combinations and features from the detailed description.

A requirement of a power system may be to ensure an efficient delivery of power to a load. To enable the efficient delivery, monitoring of the power in terms of sensed voltages, currents and impedance by sensors of interconnected components of the power system may be conveyed to a controller for an analysis. The result of the analysis may be to send control signals responsive to the analysis to the interconnected components of the power system. The interconnected components may include sources of direct current (DC) power such as photovoltaic (PV) generators, wind power turbines, DC generators and/or batteries. DC to DC converters may be connected to the DC sources and the outputs of the DC to DC converters may be connected together to provide multiple strings which may be connected across a load. The load may be a DC to alternating current (AC) inverter which has an output which may be connected to a utility grid or a localized grid which may be separate to the utility grid.

The control signals as a result of the analysis may ensure that the interconnected components of the power system perform in concert to ensure efficient delivery of power to a load for example. The conveying and monitoring of the applied control signals may provide a dynamic way of providing efficient delivery of power to a load by use of control methods (e.g., adaptive and/or robust control methods). The use of control methods (e.g., adaptive and/or robust control methods) may be included in a power system which may include a source of direct current (DC) voltage supplied across a first output terminal and a second output terminal. A DC to AC inverter may include a first input terminal and a second input terminal. The first input terminal and the second input terminal may be connectable to the first output terminal and the second output terminal respectively. The DC to AC inverter may further include a third input terminal. The system may include a converter adaptable to convert a source of power on a third input terminal and a fourth input terminal to a DC output voltage on a third output terminal. The third input terminal and/or the fourth input terminal may be connectable to a ground. The third output terminal may be connectable to the first input terminal and/or the second input terminal. The voltage of the first input terminal and/or the second input terminal may be configurable and/or controllable to be substantially above or below the potential of the ground. The third output terminal may be connectable to the third input terminal. The source of power may be from at least one of a DC voltage and an AC voltage. The source of DC voltage may include a DC to DC converter with an output connected to the first output terminal and the second output terminal and a photovoltaic panel may connect to the input of the DC to DC converter.

The disclosure herein may include a method for a power system to provide a source of DC voltage across a first output terminal and a second output terminal of the source. The DC voltage may be applied to the input of an inverter. The DC voltage may be inverted to an AC voltage by the inverter. An electrical parameter (e.g. voltage, current, power, frequency, etc.) related to the inverting may be sensed on at least one of the first output terminal and the second output terminal. A converter may convert a source of power received on input terminals to a DC output power responsive to the sensed parameter, and one of the input terminals of the converter may be connected to a reference terminal. The DC output power may be added to the source of DC voltage on at least one of the first output terminal and the second output terminal. A voltage potential that may be substantially above or below a reference potential of the reference terminal may be established and maintained at the first output terminal and/or the second output terminal. The reference potential may be a ground potential. The power source may provide power at a DC voltage and/or at an AC voltage.

The disclosure herein may include a power system including a first group of DC power sources, and a first group of power converters with inputs connectable respectively to the power sources on multiple first terminals and second terminals. The outputs of the power converters may be connected in series between first output terminals and second output terminals. Multiple DC to AC inverters with inputs may be connected in parallel across first output terminals and the second output terminals. A second group of power converters may be adapted to convert power from multiple power sources on third input terminals and fourth input terminals to DC output voltages on third output terminals. The power sources may be DC voltages and/or AC voltages. At least one of the third input terminals and/or the fourth input terminals may be connectable to a ground. The third output terminals may be connectable to at least one of the first input terminals and the second input terminals. The voltages of at least one of the first input terminals and the second input terminals are configurable to be above or below the potential of the ground.

Regulating a reference voltage at one or more points in a power system may increase lifetime of components of the power system by alleviating certain voltage-affected degradation effects, for example, Potential Induced Degradation (PID). For example, if a voltage at a DC terminal of a PV string is regulated to be at a non-negative voltage (e.g. 0V, 10V or 50V), the entire string may be of non-negative voltage, and PID (which may be common in systems featuring negative voltages with respect to ground) may be alleviated or reduced. Another benefit of regulating a reference voltage at one or more points in a power system may be to enable extension of photovoltaic strings by referencing certain points in the power system to a voltage within regulatory limits.

As noted above, this Summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. In the drawings, like numerals reference similar elements.

DETAILED DESCRIPTION

In the following description of various illustrative features, reference is made to the accompanying drawings, which form a part hereof, and in which is shown, by way of illustration, various features in which aspects of the disclosure may be practiced. It is to be understood that other features may be utilized and structural and functional modifications may be made, without departing from the scope of the present disclosure.

By way of introduction, features may be directed to system and methods in an interconnected power system to enable the voltage applied to terminals of an inverter are no longer floating voltages but may instead be established and maintained to be above the potential of a ground and/or earth potential.

The term "multiple" as used here in the detailed description indicates the property of having or involving several parts, elements, or members. The claim term "a plurality of" as used herein in the claims section finds support in the description with use of the term "multiple" and/or other plural forms. Other plural forms may include for example regular nouns that form their plurals by adding either the letter 's' or 'es' so that the plural of converter is converters or the plural of switch is switches for example.

The terms, "substantially", and, "about", used herein include variations that are equivalent for an intended purpose or function (e.g., within a permissible variation range). Certain ranges are presented herein with numerical values being preceded by the terms "substantially" and "about". The terms "substantially" and "about" are used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Figure 1A:
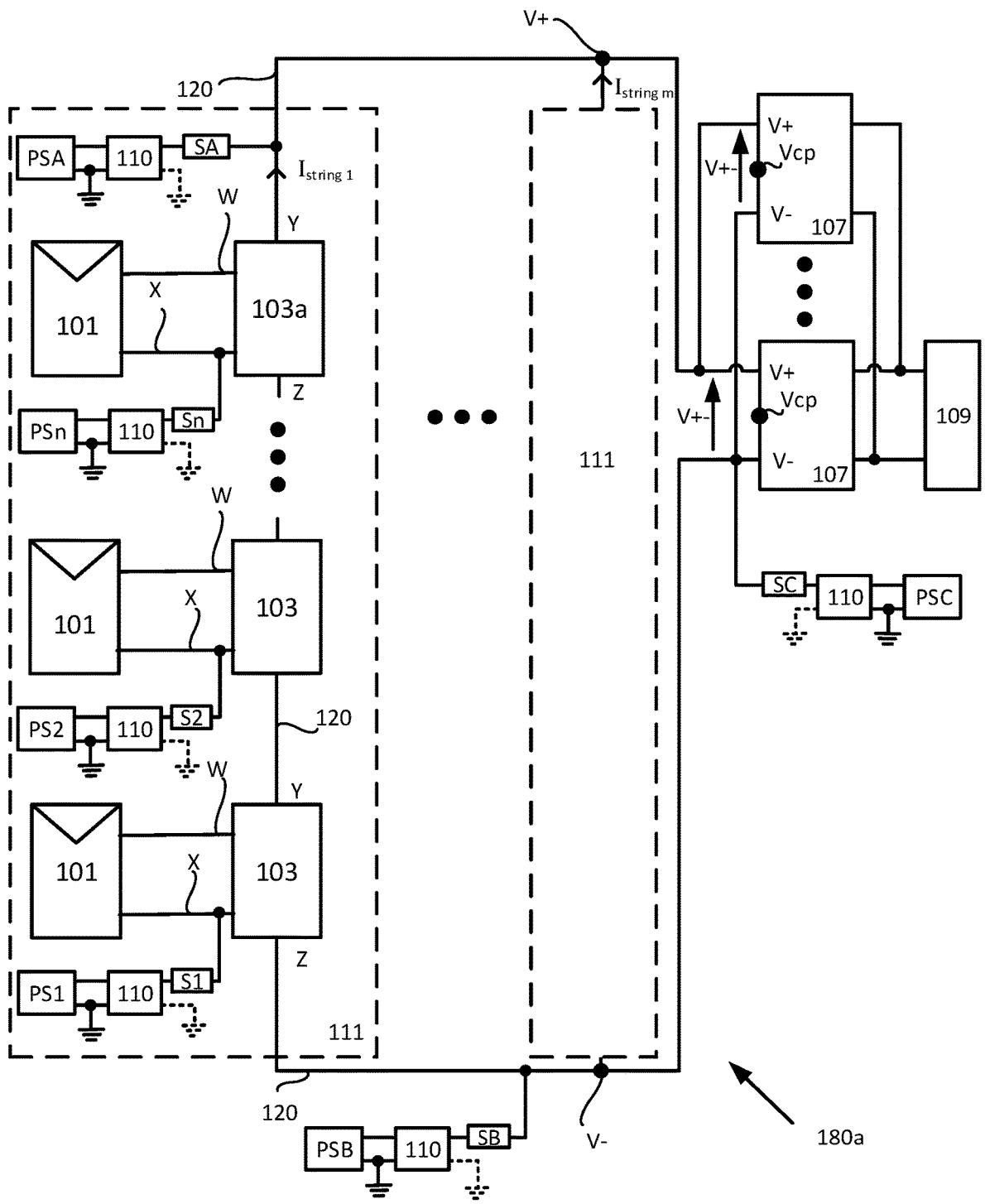
FIG. 1A illustrates a block diagram of a power system, according to illustrative aspects of the disclosure.

Reference is now made to FIG. 1A, which illustrates a power system 180a and details of wiring configurations 111 and their connections to system power device 107, according to illustrative aspects of the disclosure. System power device 107 may be a direct current (DC) to alternating current (AC) inverter and load 109 may be a utility grid, a home electrical system or other load such as a single phase and/or three phase AC motor for example. System power devices 107 and system power devices described later may be, for example, a single phase and/or three phase DC to AC converter (also known as an inverter), a DC combiner box, and/or a monitoring, communication and/or control device. Multiple system power devices 107 may be connected in parallel to each other such that the inputs to system power devices 107 are connected in parallel and the outputs of system power devices 107 are also connected in parallel. According to some features, the inputs to system power devices 107 may be connected in parallel, but the outputs of system power devices 107 may be connected to individual, unconnected loads. According to some features, the outputs of system power devices 107 may be connected in parallel, but the inputs of power devices 107 may be connected to individual, unconnected power sources.

System power devices 107 may have an input at terminals designated as terminals V+ and V− and terminal $V_{CP}$. System power device 107 may include connection terminal $V_{CP}$ which may optionally connect to another connection terminal $V_{CP}$ of another system power device 107. According to some features, terminal $V_{CP}$ may be a terminal internal to system power device 107 and not accessible for direct electrical connection to an external device (e.g., a different system power device 107).

Converter 110 may be connected to power supply PSC and may provide a voltage to a terminal of system power device 107. In FIG. 1A, an output of converter 110 is shown connected to DC terminal V− of system power device 107. According to some features, the output may optionally connect to DC terminal V+ of system power device 107 and/or connection terminal $V_{CP}$. An input to converter 110 may be from power supply PSC, where one of the input connections to converter 110 is connected to ground and/or earth. Power supply PSC may provide a source of DC power to be converted by converter 110. The source of DC power may be provided from a power source 101 (e.g., a PV generator) connected to power device 103/103a, from a power device 103/103a, from the string of series connected power devices 103/103a and/or from an auxiliary source of DC power which may be separate from the DC power of power system 180a (e.g. from a storage device such as a battery). The source of DC power may be provided from a conversion of AC power provided from the output of system power device 107, an AC grid supply which may or may not be connected to system power device 107, and/or from an auxiliary source of AC power which may be separate from the AC power of power system 180a. According to some features, PSC may be an AC power source (e.g., a flywheel storage device or a wind turbine) and converter 110 may be an AC-to-DC converter.

Using power supply PSA as an example which may also apply to the other power supplies PS1-PSn, PSB, PSC and their respective converters 110, converter 110 may have a switch SA. Switch SA may be configurable to connect or disconnect the output of converter 110 from terminals Y, V+. Similarly, switches S1-Sn may be configurable to connect or disconnect the output of respective converters 110 from terminals X, and switches SB/SC may be configurable to connect or disconnect the output of respective converters 110 from terminals Z, V−. In the drawings, a ground is shown (as a solid line) with a connection to the point where one of the terminals of power supplies PS1-PSn, PSA, PSB, PSC connects to an input terminal of respective converter 110. Alternatively, a ground (in dotted line) may connect to one of the output terminals of respective converter 110, and power supplies PS1-PSn, PSA, PSB, PSC connected to the input of converters 110 may be left without a direct connection to ground. In general, switches S1-Sn, SA, SB and SC may be connected separately to their respective converters 110 or may be an integrated/internal part of respective converters 110. For descriptions and drawings that follow, switches on the outputs of converters 110 are not explicitly shown, but may or may not be included on the output of converters 110. Similarly, in the descriptions that follow, ground connections on the outputs of converters 110 (not shown in the descriptions and diagrams that follow) may be used instead of connections to the point where one of the terminals of power supplies PS1-PSn, PSA, PSB, PSC connects to an input terminal of a respective converter 110.

Multiple wiring configurations 111 are shown connected in parallel at terminals V+ and V− which connect to the input of system power device 107 to provide voltage input V+− to the input of system power device 107. The output of system power device 107 may connect to load 109. Each wiring configuration 111 may include one or more power sources 101 which may be connected to a respective power device 103 and/or power device 103a at terminals W, X. The outputs of power devices 103/103a at terminals Y, Z may be connected together to form a serial string which connects between terminals V+ and V−. As such, for 'm' strings, the 'm' strings may provide respective currents $I_{string\ 1}$-$I_{string\ m}$ into power device 107 and voltage V+− across input terminals of power device 107. Connections between power devices 103/103a and strings of power device 103/103a devices connected to system power devices 107 may be by use of power lines 120.

Converters 110 are shown connected to system power device 107 and may also be connected to power devices 103/103a. Converter 110 may be an integrated part of system power devices 107/power devices 103/103a and/or retrofitted to system power devices 107/power devices 103/103a. Multiple converters 110 within wiring configuration 111 are shown where for each converter 110, a number of 'n' power supplies PS1-PSn are connected to the input of each respective converter 110, where one of the inputs to each converter 110 may be connected ground and/or earth. The output of each converter 110 with respective power supplies PS1-PSn may be connected to terminal X of power devices 103a/103. Alternatively, the output of each converter 110 with respective power supplies PS1-PSn may be connected to terminal W of power devices 103a/103. Power supply PSA connected to converter 110 has the output of converter 110 connected to terminal Y of power device 103a but may also connect to terminal Z of power device 103a. In a similar manner, a number of power supplies, similar to power supply PSA, with respective connections to converters 110, may have respective outputs of converters 110 which connect to terminal Y and/or Z of remaining power devices 103 in wiring configurations 111. According to some features described below, converter 110 may be a DC to DC converter such as a Buck, Boost, Buck/Boost, Buck+Boost, Cuk, Flyback, single-ended primary-inductor converter (SEPIC) and/or forward converter, switched auto-transformer or a charge pump. In other descriptions below converters 110 may be AC to DC converters such as uncontrolled diode rectifier circuits, phase-controlled rectifiers and/or switched mode power supply (SMPS).

Power supplies PS1-PSn, PSA may provide a source of DC power to be converted by converters 110. The source of DC power may be provided from a power source 101 connected to power device 103/103a, from a power device 103/103a, from the string of series connected power devices 103/103a and/or from an auxiliary source of DC power which may be separate from the DC power of power system 180a. The source of DC power may be provided from a conversion of AC power provided from the output of system power device 107, an AC grid supply which may or may not be connected to system power device 107, and/or from an auxiliary source of AC power which may be separate from the AC power of power system 180a. Features and operation of converters 110 are described in greater detail below in the descriptions which follow.

According to some features, one or more wiring configurations 111 might not include power devices 103a or 103. For example, a wiring configuration 111 may include multiple power sources 101 directly connected in series or in parallel. For example, a wiring configuration 111 may have ten, twenty or thirty serially-connected photovoltaic panels. According to some features, a wiring configuration 111 may include a first group of one or more directly connected power sources 101, with a second group of one or more power sources 101 connected via power devices 103a or 103 connected to the first group. This arrangement may be useful in power installations where some power sources 101 may be susceptible to factors which reduce power generation (e.g. PV generators which are occasionally shaded by shade, wind turbines which occasionally suffer from a reduction in wind) and where other power sources 101 are less susceptible to power-reducing factors.

Whereas power supplies PS1-PSn, PSA and respective converters 110 may be included in a wiring configuration 111, it may also be possible to connect a power supply and a corresponding converter to an overall parallel connection of wiring configurations 111. An example of the connection to the overall parallel connection may be power supply PSB and its respective converter 110 output is shown connected to terminal Z/V− via switch SB. In a similar way, the connection to the overall parallel connection may be power supply PSA and a corresponding converter 110 may be connected to terminal Y/V+ via switch SA. A power supply and corresponding converter may be electrically terminated in a junction box and located in proximity to power sources 101/power modules 103/103a, at some point in the wiring of power cables 120 between wiring configurations 111 and system power devices 107, and/or at power devices 107 for example.

As shown in FIG. 1A, the power supplies PS1-PSn, PSA, and PSC connected via a converter 110 to a terminal (e.g. any of terminals X, terminal V−, or terminal V+) in wiring configuration 111 may ensure that the voltage at each terminal is maintained at a desirable voltage point with respect to the ground potential, or ensure voltages V+ and V− applied to system power device 107 to be symmetrical at terminals V+ and V− of system power device 107 with respect to terminal Vcp which may also be connected to earth potential for example. With respect to FIG. 1A and other figures which follow, multiple power supplies PS1-PSn, PSA, PSB, PSC and respective converters 110/switches S1-Sn, SA, SB, SC are shown to illustrate where use of one or more power supplies and converters 110 may be connected to establish that the voltage at each terminal V+, V− is maintained at a desirable voltage point with respect to the ground potential, or to ensure that voltages applied to terminals V+ and V− of system power device 107 are symmetrical at terminals V+ and V−.

Figure 1B:
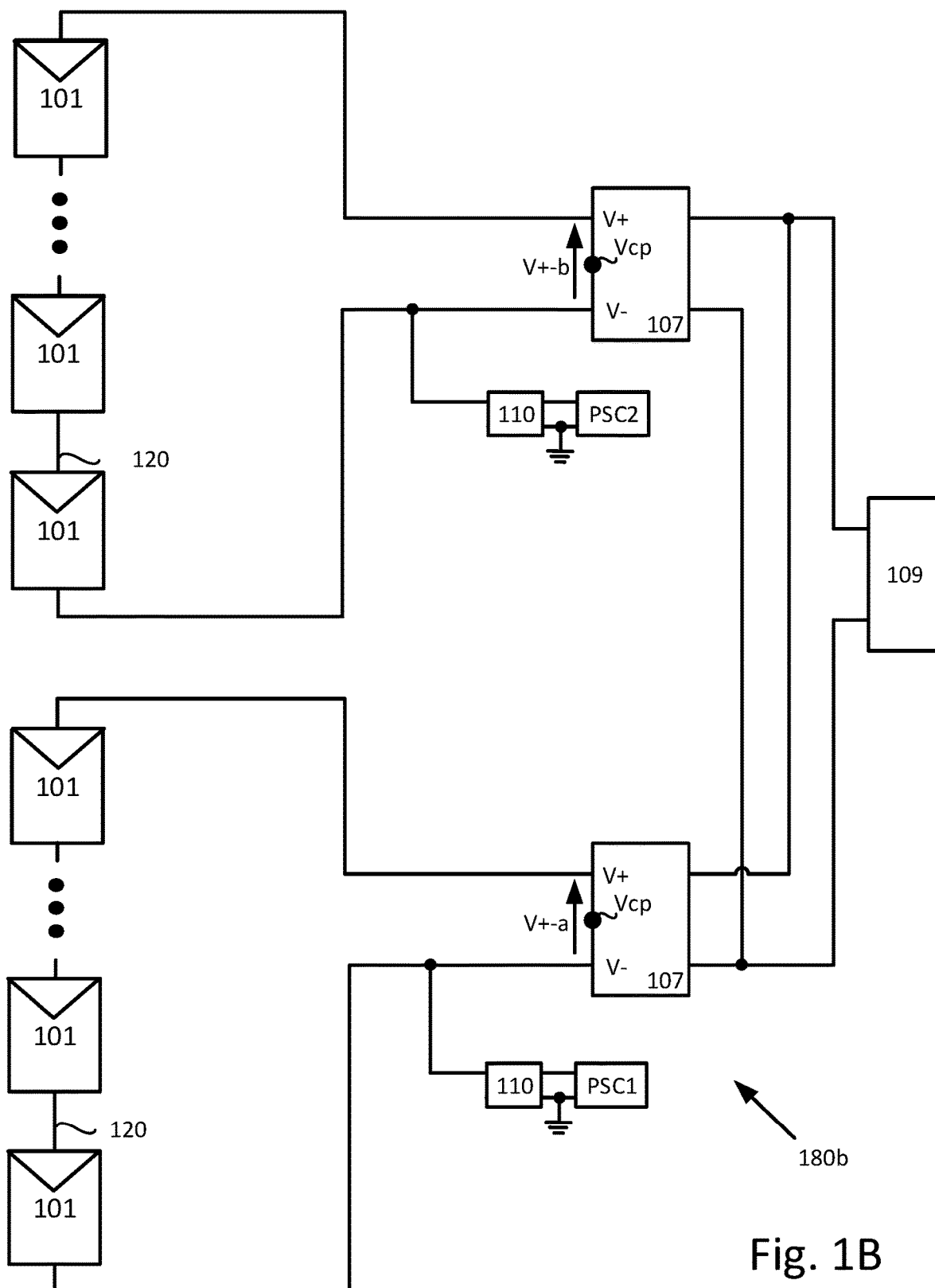
FIG. 1B illustrates a block diagram of a power system, according to illustrative aspects of the disclosure.

Reference is now made to FIG. 1B, which illustrates a power system 180b, according to illustrative aspects of the disclosure. Two or more strings of serially connected power sources 101 may be connected across the respective inputs of system power devices 107 as DC voltages V+−a and V+−b. Power lines 120 connect power sources 101 together in series and the string formed thereby to the input of a system power device 107. The outputs of system power devices 107 may be connected in parallel and to load 109. Power supplies PSC1/PSC2 may provide a respective DC input to respective converters 110. Features included and described in further detail in the descriptions of converters 110 herein may allow both power supplies PSC1/PSC2 via respective converters 110 to be connected to respective system power devices 107 or just one of power supplies PSC1/PSC2 to be connected to a system power device 107. Connection of an output of converter 110 may be to either terminal (V+, V−) of system power device 107. One of the terminals of power supplies PSC1/PSC2 may be referenced to a desirable voltage point with respect to ground and/or a ground potential as shown.

For example, as shown in FIG. 1B, a first string of serially-connected power sources 101 may be connected to the input of a first system power device 107, and a second string of serially-connected power sources 101 may be connected to the input of a second system power device 107. The first and second system power devices might not be connected at input terminals and may be (as shown in FIG. 1B) connected in parallel at the output side of the system power devices 107. According to some features, power sources PSC1 and PSC2 and corresponding converters 110 may both be featured, for example, where power sources PSC1 and PSC2 and corresponding converters 110 are integrated in system power devices 107. According to some features (e.g., where a power source PSC1/PSC2 and a corresponding converter 110 are retrofit to a power system), a single power source and converter may be connected to the first system power device 107, and compensation voltage output by converter 110 may propagate to the second system power device 107 due to the parallel-output-connection of the first and second system power devices 107.

A control feature of power system 180b may be to establish and maintain the voltage applied to a terminal V− to be above the potential of the ground connection provided by a converter 110 or to establish and maintain the voltage applied to terminal V− to be below the potential of the ground connection provided by converter 110 if the polarity of the input to converter 110 from the power supply is reversed for example. Yet further, the control feature may include the feature to ensure voltage V+− applied to system power device 107 to be symmetrical at terminals V+ and V− of system power device 107. In other words, an equal amount of positive DC voltage and negative DC voltage may be applied on respective terminals V+ and V− of system power device 107 to maintain a symmetric string voltage across system power device 107.

Power supplies PSC1/PSC2 may provide sources of DC power to be converted by respective converters 110. The source of DC power may be provided from a power source 101 connected to power device 103/103a, from a power device 103/103a, from the string of series connected power devices 103/103a and/or from an auxiliary source of DC power which may be separate from the DC power of power system 180b (e.g. from a storage device such as a battery). The source of DC power may be provided from a conversion of AC power provided from the output of system power device 107, an AC grid supply which may or may not be connected to system power device 107, and/or from an auxiliary source of AC power which may be separate from the AC power of power system 180b. According to some features, power supplies PSC1/PSC2 may be AC power sources (e.g., a flywheel storage device or a wind turbine) and converters 110 may be AC-to-DC converters.

Figure 1C:
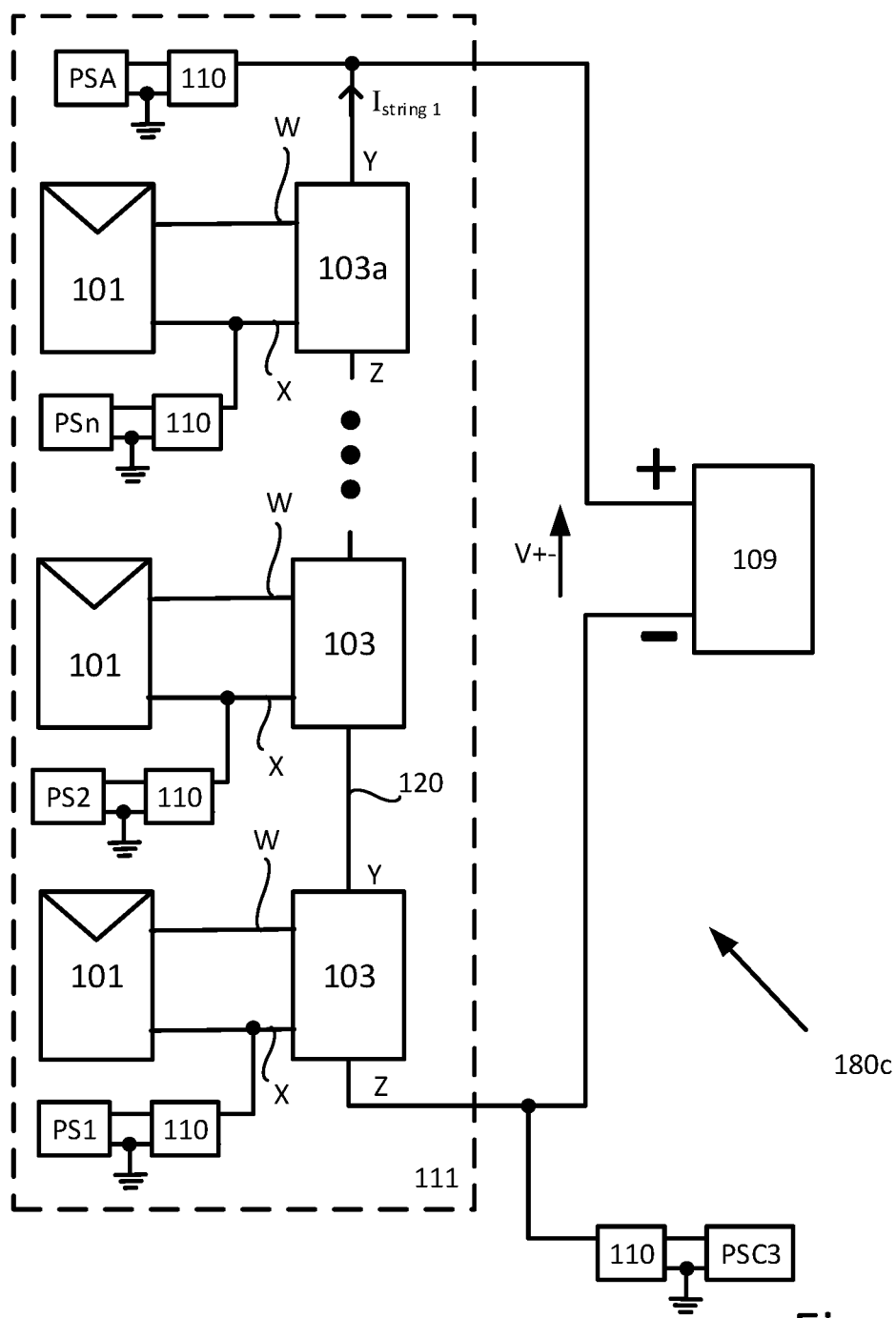
FIG. 1C illustrates a block diagram of a power system, according to illustrative aspects of the disclosure.

Reference is now made to FIG. 1C, which illustrates a power system 180c, according to illustrative aspects of the disclosure. Power system 180c may be a DC-only system where the DC output of wiring configuration 111, described above with respect to FIG. 1A, is connected to a DC load 109. Even though one wiring configuration 111 is shown in FIG. 1C, it should be understood that multiple wiring configurations 111 may be connected together in various series/parallel and/or parallel interconnections that may be applied to DC load 109. Alternatively, or in addition, power supply PSC3 may be connected to the negative (−) terminal of DC load 109 and/or the positive (+) terminal of DC load 109. One or more power supplies PSn located/connected in wiring configuration 111 (e.g. at inputs to power devices 103 and/or at intermediate points within wiring configuration 111) may enable voltage V+− applied to DC load 109 to be symmetrical at terminals + and − of DC load 109. In other words, an equal amount of positive DC voltage and negative DC voltage may be applied on respective terminals + and − of DC load 109 to maintain a symmetric string voltage across load 109. Load 109 may be a DC load such as a DC motor, a battery and/or be the input of a DC to DC converter or the input of a DC to AC inverter. According to some features, one or more power supplies PSn located/connected in the middle of wiring configuration 111 (e.g. at inputs to power devices 103 and/or at intermediate points within wiring configuration 111) may maintain all voltages in wiring configuration 111 at a non-negative or non-positive voltage with respect to ground, which may alleviate potential induced degradation.

Figure 1D:
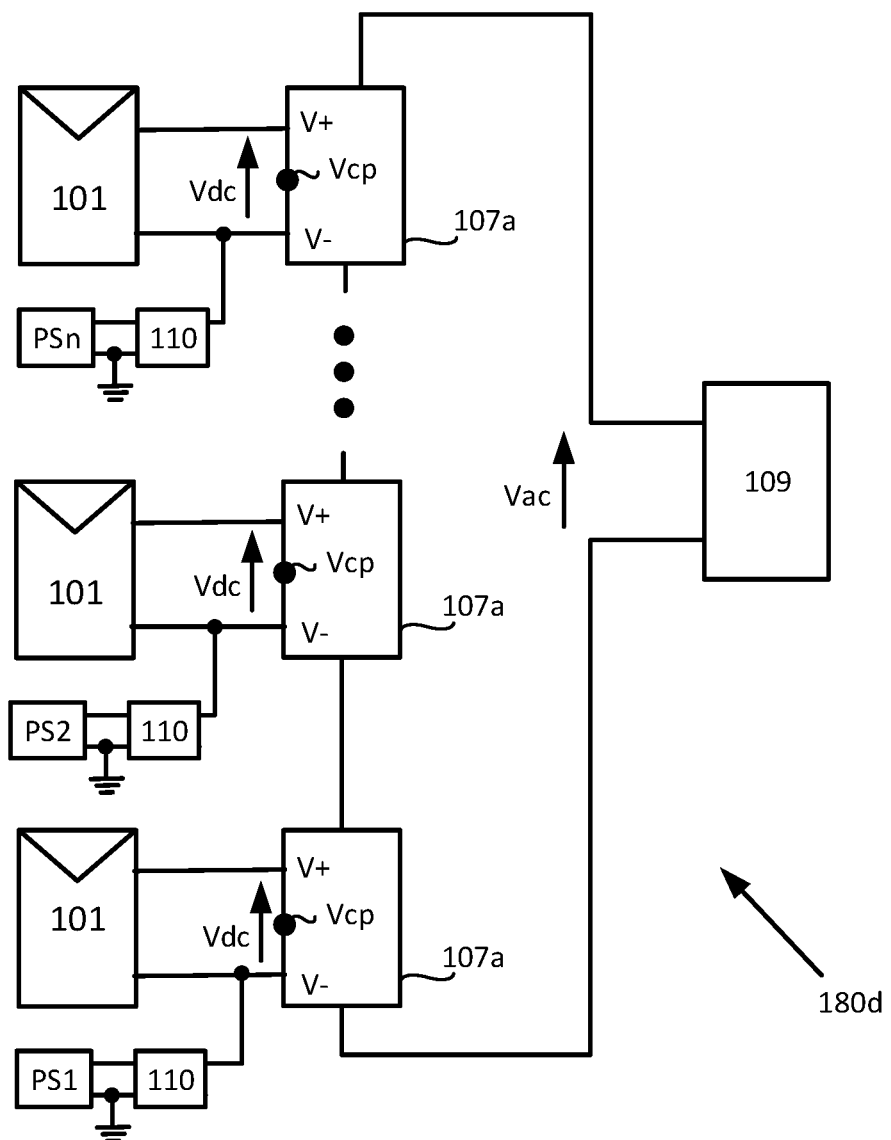
FIG. 1D illustrates a block diagram of a power system, according to illustrative aspects of the disclosure.

Reference is now made to FIG. 1D, which illustrates a power system 180d, according to illustrative aspects of the disclosure. Power system 180d includes a series string of micro inverter 107a AC outputs connected to an AC load 109. The outputs of micro inverter 107a may be single phase or three phase. The DC inputs to each of the micro inverters 107a may be supplied by a power source 101. Multiple power supplies PS1, PS2-PSn may connect to terminals V− of respective micro inverters 107a via the outputs of converters 110. The inputs of converters 110 may connect to respective power supplies PS1, PS2-PSn. The outputs of a converter 110 may connect to either terminal V+ or V− of a microinverter 107a.

As a numerical example, the Vac voltage across a string of serially connected inverters may be 110 Vrms. Power source PS1 may be connected to a converter 110 configured to output 150 VDC to an input (as illustrated) or output of inverter 107a, ensuring that the voltage at any point in power system 180d does not fall below 0V with respect to ground.

Figure 1E:
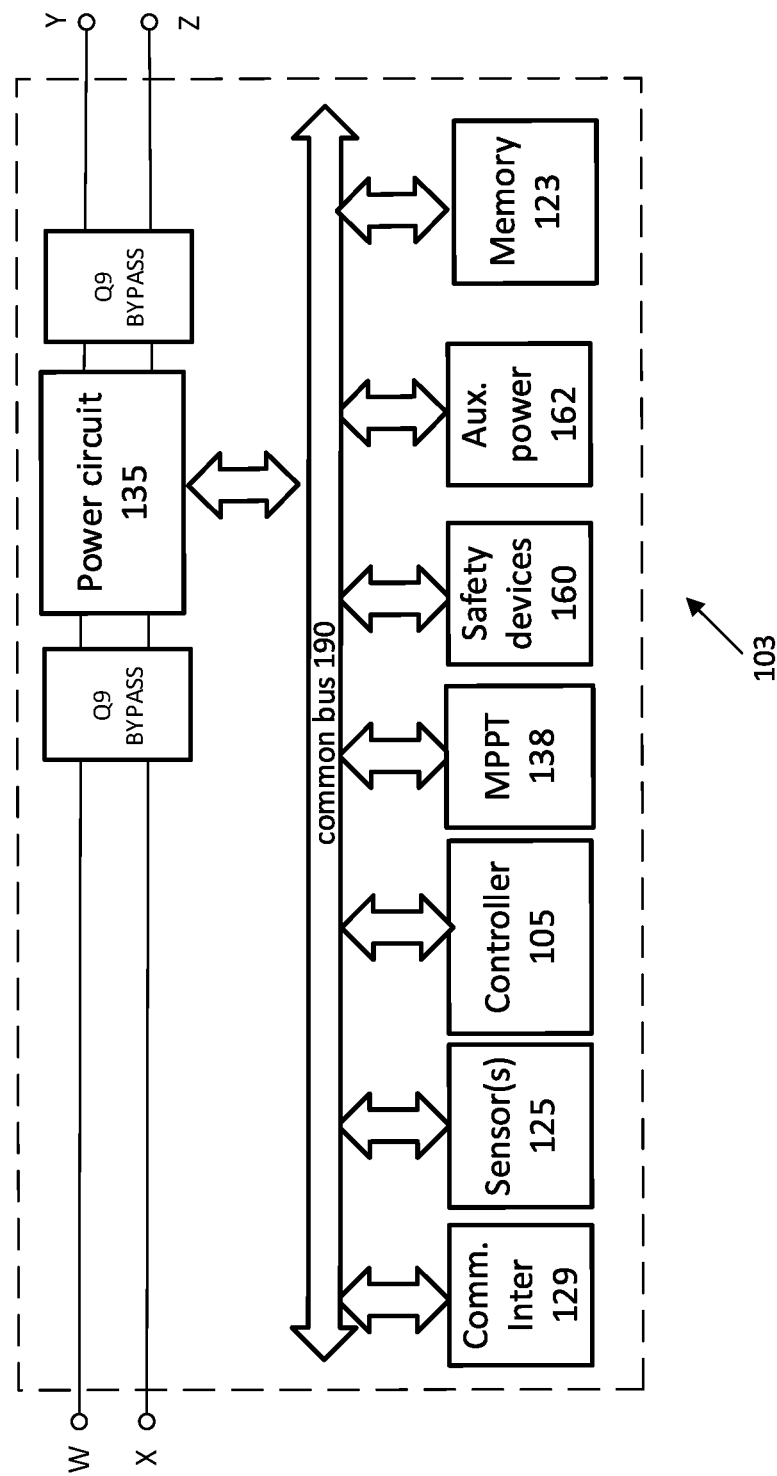
FIG. 1E illustrates circuitry which may be found in a power device such as power devices shown in FIG. 1A, according to illustrative aspects of the disclosure.

Reference is now made to FIG. 1E, which illustrates circuitry that may be found in a power device 103, according to illustrative aspects of the disclosure. Power device 103 may be similar to or the same as power devices 103/103a shown in FIG. 1A which may provide respective input and output terminals W, X and Y, Z. Input and output terminals W, X and Y, Z may provide connection to power lines 120 (not shown). According to some features, power device 103/103a may include power circuit 135. Power circuit 135 may include a direct current-direct current (DC/DC) converter such as a Buck, Boost, Buck/Boost, Buck+Boost, Cuk, Flyback and/or forward converter, or a charge pump. In some features, power circuit 135 may include a direct current to alternating current (DC/AC) converter (also known as an inverter), such as a micro-inverter. Power circuit 135 may have two input terminals and two output terminals, which may be the same as the input terminals and output terminals of power device 103/103a. In some features, Power device 103/103a may include Maximum Power Point Tracking (MPPT) circuit 138, configured to extract increased power from a power source.

According to some features, power circuit 135 may include MPPT functionality. In some features, MPPT circuit 138 may implement impedance matching algorithms to extract increased power from a power source the power device may be connected to. Power device 103/103a may further include controller 105 such as a microprocessor, Digital Signal Processor (DSP), Application-Specific Integrated Circuit (ASIC) and/or a Field Programmable Gate Array (FPGA).

Still referring to FIG. 1E, controller 105 may control and/or communicate with other elements of power device 103/103a over common bus 190. According to some features, power device 103/103a may include circuitry and/or sensors/sensor interfaces 125 configured to measure operating power parameters directly or receive measured operating power parameters from connected sensors and/or sensor interfaces 125 configured to measure operating power parameters on or near the power source, such as the voltage and/or current output by the power source and/or the power output by the power source. According to some features, the power source may be a photovoltaic (PV) generator comprising PV cells, and a sensor or sensor interface may directly measure or receive measurements of the irradiance received by the PV cells, and/or the temperature on or near the PV generator.

Still referring to FIG. 1E, according to some features, power device 103/103a may include communication interface 129, configured to transmit and/or receive data and/or commands from other devices. Communication interface 129 may communicate using Power Line Communication (PLC) technology, acoustic communications technology, or additional technologies such as ZIGBEE™, Wi-Fi, BLUETOOTH™, Cellular communication or other wireless methods. Power Line Communication (PLC) may be performed over power lines 120 between power devices 103/103a and system power device (e.g. inverter) 107 which may include a similar communication interface as communication interface 129.

According to some features, power device 103/103a may include memory 123, for logging measurements taken by sensor(s)/sensor interfaces 125 to store code, operational protocols or other operating information. Memory 123 may be flash, Electrically Erasable Programmable Read-Only Memory (EEPROM), Random Access Memory (RAM), Solid State Devices (SSD) or other types of appropriate memory devices.

Still referring to FIG. 1E, according to some features, power device 103/103a may include safety devices 160 (e.g. fuses, circuit breakers and Residual Current Detectors). Safety devices 160 may be passive or active. For example, safety devices 160 may include one or more passive fuses disposed within power device 103/103a where the element of the fuse may be designed to melt and disintegrate when excess current above the rating of the fuse flows through it, to thereby disconnect part of power device 103/103a so as to avoid damage. According to some features, safety devices 160 may include active disconnect switches, configured to receive commands from a controller (e.g. controller 105, or an external controller) to short-circuit and/or disconnect portions of power device 103/103a, or configured to short-circuit and/or disconnect portions of power device 103/103a in response to a measurement measured by a sensor (e.g. a measurement measured or obtained by sensors/sensor interfaces 125). According to some features, power device 103/103a may include auxiliary power circuit 162, configured to receive power from a power source connected to power device 103/103a, and output power suitable for operating other circuitry components (e.g. controller 105, communication interface 129, etc.). Communication, electrical connecting and/or data-sharing between the various components of power device 103/103a may be carried out over common bus 190. According to some features, auxiliary power circuit 162 may be connected to an output of a power device 103/103a and designed to receive power from power sources connected to other power devices.

Power device 103/103a may include or be operatively attached to a maximum power point tracking (MPPT) circuit. The MPPT circuit may also be operatively connected to controller 105 or another controller 105 included in power device 103/103a which may be designated as a primary controller. Power device 103a in FIG. 1A may be an example of a power device having primary controller, and in this example power devices 103 are secondary devices having secondary controllers. A primary controller in power device 103a may communicatively control one or more other power devices 103 which may include controllers known as secondary controllers. Once a primary/secondary relationship may be established, a direction of control may be from the primary controller to the secondary controllers. The MPPT circuit under control of a primary and/or secondary controller 105 may be utilized to increase power extraction from power sources 101 and/or to control voltage and/or current supplied to system power device (e.g. an inverter or a load) 107. According to some aspects of the disclosure, a primary power device 103a might not be featured, and wiring configuration 111 may feature power devices 103, without any of power devices 103 featuring a primary controller.

Referring still to FIG. 1E, in some features, power device 103/103a may include bypass unit Q9 coupled between the inputs of power circuit 135 and/or between the outputs of power circuit 135. Bypass unit Q9 and/or power circuit 135 may be a junction box to terminate power lines 120 or to provide a safety feature such as fuses or residual current devices. Bypass unit Q9 may also be an isolation switch for example. Bypass unit Q9 may be a passive device, for example, a diode. Bypass units Q9 may be controlled by controller 105. If an unsafe condition is detected, controller 105 may set bypass unit Q9 to ON, short-circuiting the input and/or output of power circuit 135. In a case in which the pair of power sources 101 are photovoltaic (PV) generators, each PV generator provides an open-circuit voltage at its output terminals. When bypass unit Q9 is ON, a PV generator may be short-circuited, to provide a voltage of about zero to power circuit 135. In both scenarios, a safe voltage may be maintained, and the two scenarios may be staggered to alternate between open-circuiting and short-circuiting PV generators. This mode of operation may allow continuous power supply to system control devices, as well as provide backup mechanisms for maintaining a safe voltage (i.e., operation of bypass unit Q9 may allow continued safe operating conditions).

In some features, a power device 103/103a may comprise a partial group of the elements illustrated in FIG. 1E. For example, a power device 103/103a might not include power circuit 135 (i.e. power circuit 135 may be replaced by a short circuit, and a single bypass unit Q9 may be featured. In a scenario where power circuit 135 is not present, power device 103/103a may be still used to provide safety, monitoring and/or bypass features.

Figure 1F:
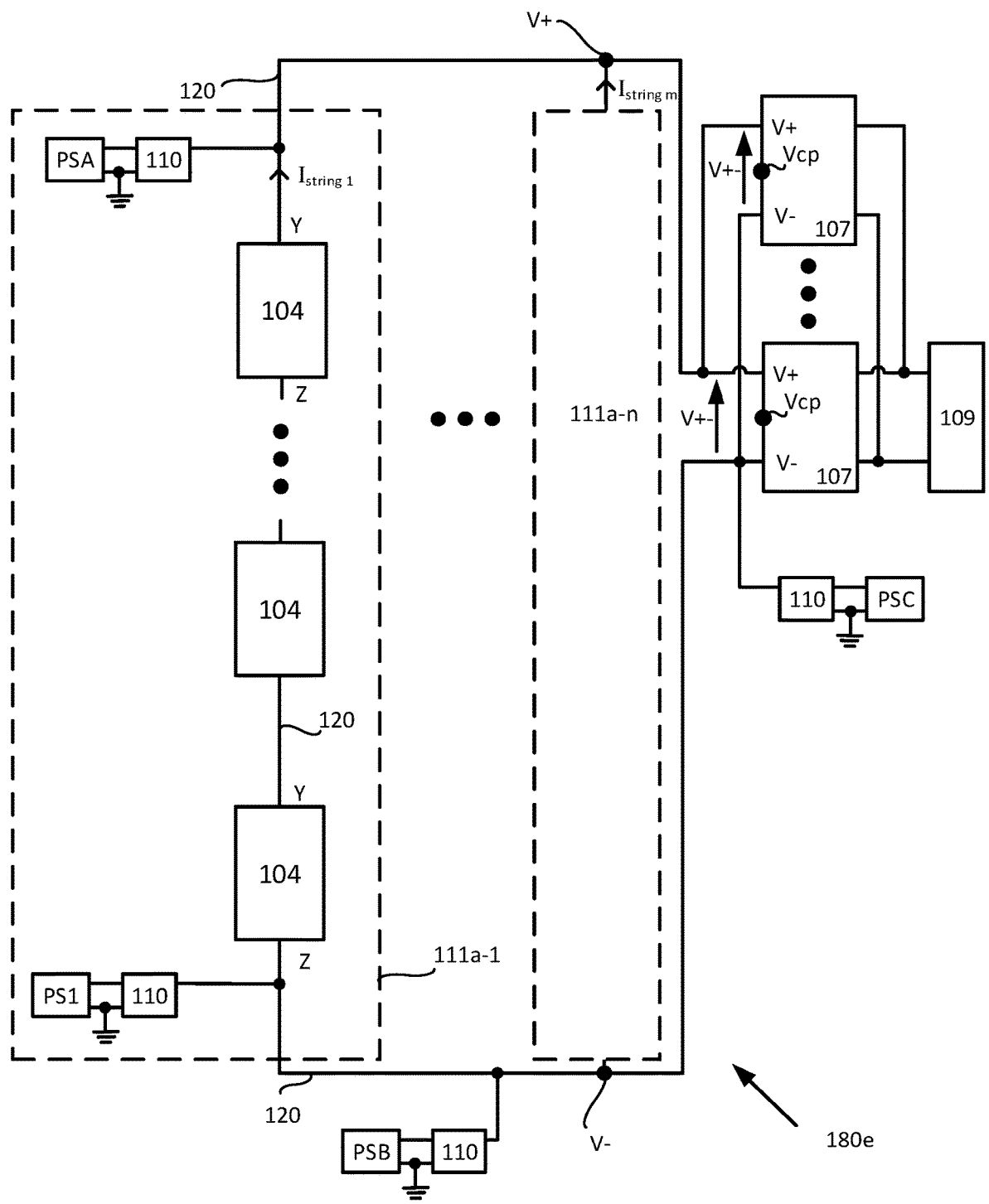
FIG. 1F illustrates a block diagram of a power system, according to illustrative aspects of the disclosure.

Reference is now made to FIG. 1F, which illustrates a power system 180e and details of wiring configurations 111a-1-111a-n connected to system power devices 107, according to illustrative aspects of the disclosure. Wiring configuration 111a-1 may be the same as wiring configuration 111a-n or may be different. For the sake of ease of discussion that follows, wiring configurations are considered the same and referred to as wiring configuration(s) 111a-n. Power system 180e is similar to power system 180a of FIG. 1A in that multiple wiring configurations 111a-n are connected in parallel and provide voltage V+− to system power devices 107 just like multiple wiring configurations 111 are connected in parallel to provide voltage V+ to system power devices 107 at terminals V+ and V− in FIG. 1A. Wiring configuration 111a-n may include a series connection of power sources 104 and/or a single power source 104, where the series connection is connected across terminals V+ and V− of system power devices 107. Alternatively, wiring configuration 111a-n may include various series/parallel connections of power sources 104. Power sources 104 may be similar and/or dissimilar, for example, power sources 104 may similarly be batteries but dissimilar in terms of the battery type (for example Nickel-cadmium (NiCad), Lithium, lead acid), the voltages provided by each battery as well as ratings of each battery in terms of ampere hour (Ah) for example. As such, power sources 104 may be a variety of power sources such as batteries, photovoltaic panels, DC generators and/or a combination of power source 101 and respective power device 103/103a as shown with respect to power system 180a. According to features of the disclosure herein, and as shown in FIG. 1F, power devices 103/103a might not be featured at all, rather, a series string of power sources may be formed by directly serially connecting output terminals of each power source 104.

Connections of power supplies PS1, PSA and PSC to terminals Y/V+ and/or Z/V-via converters 110, according to descriptions which follow, may provide the option of the voltage applied to terminals V− and V+ to be no longer floating. Instead the voltages on terminals V− and V+ may be established above the potential of the ground by virtue of ground connections which may be provided by converters 110. As such by way of non-limiting example, if power sources 104 are photovoltaic panels, during daytime operation terminals V− and V+ may be kept above ground potential and at night below ground potential or vice versa. Such an arrangement for nighttime and/or daytime operation may mitigate voltage induced power degeneration of the photovoltaic panels during daytime operation as well as to affect a repair to the photovoltaic panels at nighttime. Alternatively, or in addition, to mitigate voltage induced power degeneration of the photovoltaic panels for daytime operation, for one day during daytime operation terminals V− and V+ may be kept above ground potential and the next day below ground potential and so on, in an alternating fashion.

According to features of the disclosure herein, a converter 110 may be configured to output a first voltage during the daytime and a second voltage at night. As a non-limiting example, a converter 110 may be integrated into a system power device 107 and may be configured to output a voltage to set the voltage operating point at terminal V−. When substantial input power (e.g., a power level above a first threshold) is measured at the system power device 107 (indicating a daytime condition of substantial production of photovoltaic power), converter 110 may output, for example, 10V, to ensure that all photovoltaic generators connected to the system power device input are referenced to a positive voltage. When an insubstantial input power (e.g., a power level under the first threshold or under a second threshold) is measured at the system power device 107 (indicating a nighttime condition of lack of substantial production of photovoltaic power), converter 110 may output, for example, 100V, to increase the positive voltage bias of terminal V−. Increasing the positive voltage bias of connected PV generators (e.g., by increasing the positive voltage bias of terminal V−) may reverse potential-induced degradation effects that may develop on PV generators during the daytime.

A single power supply connected via a converter 110 to a reference point (e.g. any of terminals X indicated in FIG. 1A, or terminal V−, or terminal V+) in wiring configuration 111 may be sufficient to reference the voltage of wiring configuration 111 to a desirable voltage point and/or ground potential. Multiple power sources PS1 . . . PSn illustrated show various possibilities for implementation and not to indicate that all of the power sources and corresponding converters 110 are required. In descriptions above and those that follow for power systems, power sources (power sources PS1 . . . PSn for example) may be referenced to a desirable voltage point with respect to ground and/or ground potential.

Figure 2A:
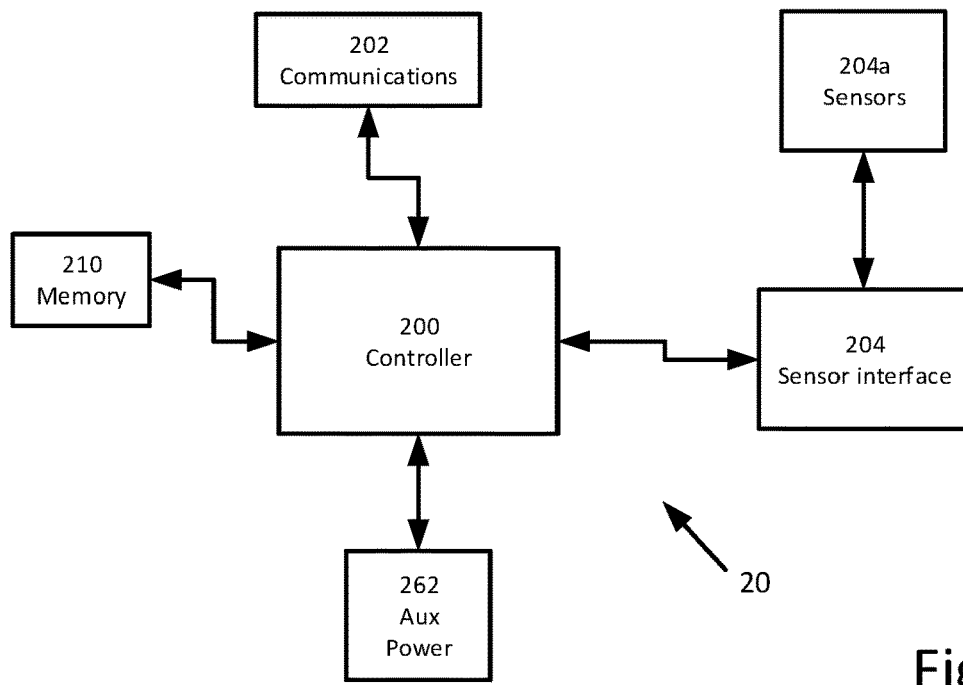
FIG. 2A shows a block diagram of further details of a controller, according to illustrative aspects of the disclosure.

Reference is now made to FIG. 2A which shows a block diagram of further details of control unit 20 which includes a controller 200, according to illustrative aspects of the disclosure. Controller 200 may include a microprocessor, microcontroller and/or digital signal processor (DSP) which may connect to a memory 210. With respect to FIG. 1A, controller 200 in one converter 110 may serve as a primary controller to the other controllers 200 of the other converters 110. As such, communications interface 202 connected to controller 200 may provide communications between controllers 200 and other controllers 200/105 included in power system 180a for example. Alternatively, a converter 110 if located in proximity to power devices 103/103a and/or system power devices 107 may be controlled by a controller of power devices 103/103a and/or system power devices 107 but may still retain the other features included in controller 200.

The communications to and from communications interfaces 202 of converters 110 may be by power line communication (PLC) over power lines 120. Communications in communications interface 202 may also include measured or sensed communication parameters via sensors 204a/sensor interface 204. Communications interfaces 202 may communicate with a local area network or cellular network in order to establish an internet connection which for example may provide a feature of remote control, remote monitoring and/or reconfiguration of power devices 103/103a and/or system power device 107 for example. Controller 200 may further include auxiliary power circuit 262, configured to receive power from a power source connected to power device 103/103a, system power device 107 and output power suitable for operating other circuitry components (e.g. controller 200, communication interface 202, etc.). According to some features, auxiliary power circuit 262 may be connected to an output of a power device 103/103a, system power device 107, power supplies PS1-PSn, PSA, Ps4 and designed to receive power from power sources connected to other power devices and/or sources of power independent from power produced by power system 180a.

In the descriptions that follow, example method of design and operation for converter 110 are shown where power supplied to the input of converter 110 is an AC power and/or a DC power which may be supplied for example from a power source 101 connected to power device 103/103a, from a power device 103/103a, from the string of series connected power devices 103/103a and/or from an auxiliary source of DC power which may be separate from the DC power of a power system 180a.

Figure 2B:
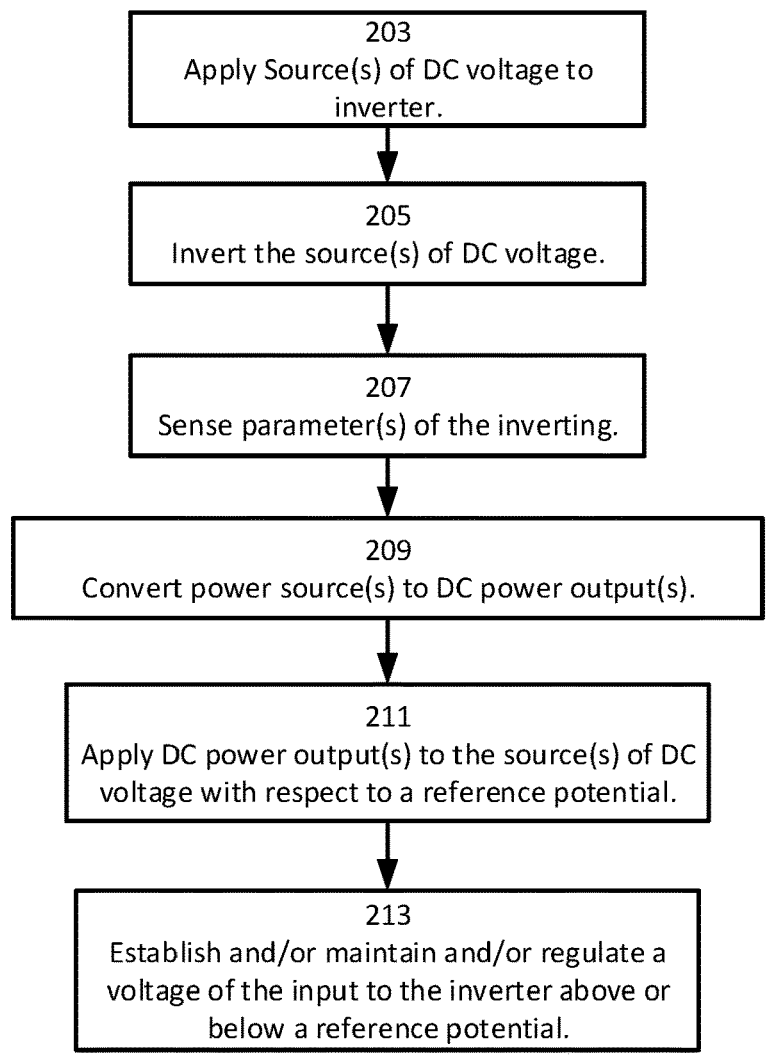
FIG. 2B shows a flowchart of a method, according to illustrative aspects of the disclosure.

Reference is now made to FIG. 2B which shows a flowchart of a method 201 according to illustrative aspects of the disclosure. Method 201 may be applied to power system 180a of FIG. 1A in the description that follows. Steps of method 201 may be implemented by one of the controllers of system power devices 107, power devices 103/103a and/or converters 110 acting as a primary controller. At step 203, DC power from wiring configurations 111 may be provided and applied to the input of system power devices 107 (e.g., inverters) across terminals V+ and V−. Within a wiring configuration 111, DC power may be provided via a string of serially connected power device 103/103a outputs where the inputs to each of the power devices 103/103a is connected to a power source 101. Alternatively, in a wiring configuration 111, a string of interconnected (e.g., connected in series or in parallel) power sources 101 may be applied to the inputs of system power devices 107.

At step 205, DC power (power=voltage x current) from the parallel connected wiring configurations 111 may be inverted by system power devices 107 to an AC power (power=voltage x current) output that may be applied to load 109.

At step 207, electrical parameters (e.g. voltage, current, power, resistance) may be sensed on terminals V−, $V_{CP}$ and/or V+ by a sensor of system power device 107. At about the same time, sensors/sensor interfaces 125 of power device 103/103a and/or the sensor interface 204/sensors 204a of converters 110 may sense electrical parameters on terminals W, X, Y, Z, V− and V+.

By way of non-limiting example, operation of power supply PS1 is referred to where power system 180a has one wiring configuration 111, where the input of converter 110 is connected to power supply PS1, and where all other power supplies and converters are not referred to or used for ease of discussion. At about the same time of step 207, in step 209, the source of DC voltage from power supply PS1 may be converted by converter 110 to provide a greater voltage at the output of converter 110 responsive to the electrical parameters sensed on W, X, Y, Z, V− and V+ in step 207. In other words, converter 110 is functioning as a boost converter. The level of the greater voltage produced at the output of converter 110 may be responsive to the electrical parameter sensed in step 207 or may be produced independently of the electrical parameters sensed in step 207. As such, responsive to the electrical parameter sensed, for example voltage of terminals Z and/or V− (but may include also terminals V+ and $V_{CP}$), the application of the output of converter 110 to terminal X and/or Z at step 211 may add the boosted output voltage of converter 110 to terminal V− of system power device 107. As such, in step 213, the voltage applied to terminal V− is no longer floating but is established above the potential of the ground connection provided by converter 110.

Included in step 213 by operation of the other steps of method 201 is maintenance of the voltage applied to terminal V− above the potential of the ground connection provided by converter 110. Moreover, if power supply PSA is used instead of power supply PS1, and if the polarity of power supply PSA is reversed, the output of converter 110 connected to PSA may be applied to terminals W, Y/V+ such that the steps of method 201 may establish and maintain the voltage applied to terminal V+ to be below the potential of the ground connection provided by converter 110. This may be desirable, for example, when power sources 101 are photovoltaic panels having properties where potential induced degradation (PID) may be reduced by maintaining all of the photovoltaic panels at a voltage below zero with respect to ground. Further, when applying the steps of method 201 in wiring configuration 111, it may be possible to make use of a power supplies PSn located/connected in the middle of wiring configuration to enable voltage V+− applied to system power devices to be symmetrical at terminals V+ and V−. In other words, an equal amount of positive DC voltage and negative DC voltage may be applied on respective terminals V+ and V− of system power device 107 to maintain a symmetric string voltage.

By way of another non-limiting example, operation of power supply PSB is referred to where power system 180a has multiple wiring configuration 111, where the input of converter 110 is connected to power supply PSB and, for ease of discussion, all other power supplies and converters are not referred to or used. At about the same time of step 207, at step 209, the source of DC voltage from power supply PSB may be converted by converter 110 to provide an output voltage that is greater than the voltage at the input of converter 110 responsive to the electrical parameters sensed in step 207. In other words, converter 110 is functioning as a boost converter for all of the wiring configurations 111. The level of the voltage produced at the output of converter 110 may be responsive to the electrical parameter sensed in step 207 or may be produced independently of the electrical parameters sensed in step 207. As such, responsive to the electrical parameter sensed, for example voltage of terminals Z and/or V− but may include also terminals V+ and $V_{CP}$, the application of the output of converter 110 to terminal Z and/or V− at step 211 may add the boosted output voltage of converter 110 to terminal V− of system power device 107.

By way of non-limiting numerical example, assume that a desirable voltage on terminal V+ is 510 volts (v) and the voltage on terminal V− is substantially above ground potential (zero volts), +10 v for example. A controller of power device 107 and/or power modules 103/103a may be utilized to maintain a string voltage for each wiring configuration 111 of 500 v (510 v-10 v). The string voltage of 500 v may be a floating voltage but any one of power sources PS1-PSn, PSA, PSB or PSC and respective converter 110 may be used (switches S1-Sn, SA, SB, SC used to select which power supply converter 110 for example) to set the voltage on terminal V− to be +10 volts and 510 v on terminal V+. As such sensors sensors/sensor interfaces 125/204/204a may be used to sense the voltage at terminals Y/V+ and Z/V− (step 207). Converter 110 may be used to apply a positive voltage (with respect to ground to terminal) to terminal Z/V− (step 211) via conversion of power from power supply PSB (step 209) so that terminals Y/V+ and Z/V− are above earth potential. As such, if the voltage sensed on terminal Y/V+ is +250 v and the voltage sensed on terminal Z/V− is −250, so that the differential voltage is 500 v, the output of the boost converter may add 260 v to terminal Z/V− so that by Kirchhoff voltage law the voltage on terminal Z/V− is 260 v-250 v=10 v and the voltage on terminal Y/V+ is 510 v=260 v+250 v.

As such, in step 213, the voltage applied to terminal V− is no longer floating but is established above the potential of the ground connection provided by converter 110 for all wiring configurations 111. Included in step 213 by operation of the other steps of method 201 is maintenance of the voltage applied to terminal V− above the potential of the ground connection provided by converter 110. Moreover, if power supply PSB is used at the top of the wiring configurations 111 and converter 110 connects to terminals Y and/or W, if the polarity of power supply PSB is reversed, the output of converter 110 connected to power supply PSB may be applied to terminals W, Y/V+ such that the steps of method 201 may establish and maintain the voltage applied to terminal V+ to be below the potential of the ground connection provided by converter 110.

Further considerations may also be considered in an application to power system 180a by use of power supply PSC instead of or in addition to power supply PSB. The overall application may use power supply PSC in steps similar to those described with respect to use of power supply PSB to again establish and maintain the voltage applied to terminal V+ to be below the potential of the ground connection provided by converter 110 or to establish and maintain the voltage applied to terminal V+ to be above the potential of the ground connection provided by converter 110. In a similar way, use of power supply PSC may establish and maintain the voltage applied to terminal V− to be below the potential of the ground connection provided by converter 110 or to establish and maintain the voltage applied to terminal V− to be above the potential of the ground connection provided by converter 110. The source of DC power converted by converter 110 may be provided from a conversion of AC power provided from the output of system power devices 107, an AC grid supply which may or may not be connected to system power devices 107, and/or from an auxiliary source of AC power which may be separate from the AC power of power system 180a.

Figure 3A:
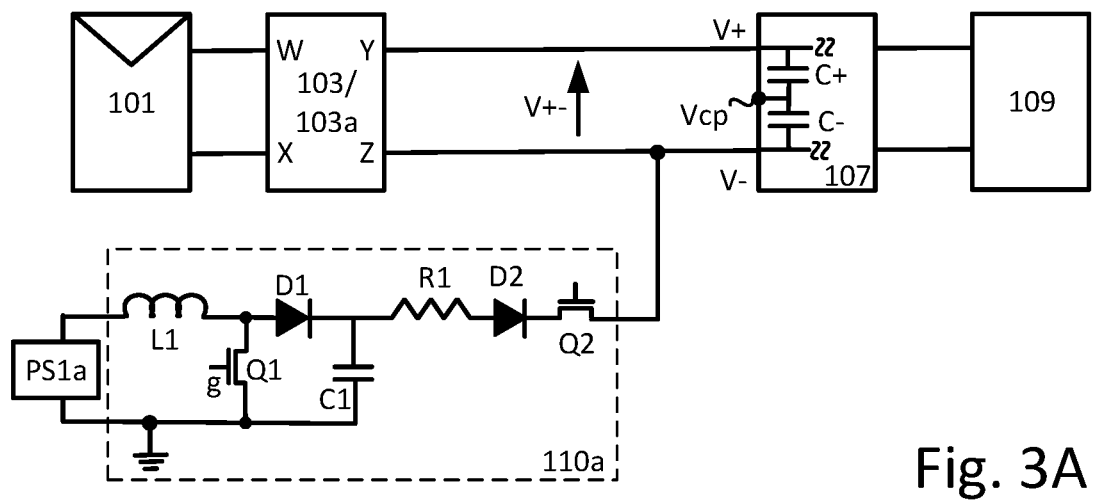
FIG. 3A shows a power system, according to illustrative aspects of the disclosure.

Reference is now made to FIG. 3A which shows a power system 180f, according to illustrative aspects of the disclosure. Power system 180f may be considered to be a simplified version of power system 180a described above and may be referenced as such, for the ease of discussion in the description which follows. A power source 101 may be connected to the input of power device 103/103a at terminals W and X. Power source 101 may be a photovoltaic panel, DC generator and/or battery/storage device. For example, power source 101 may be a string of serially connected PV power sources, or a plurality or parallel-connected strings of PV power sources. As such, since power source 101 is shown as not being grounded, the voltage input to power device 103/103a at terminals Y and Z may be considered a floating voltage. The output voltage (V+−) of power device 103/103a at terminals W and X may also be considered to be a floating output voltage that may be applied to a system power device 107 at terminals V+ and V−.

A partial view of the components of the input of system power device 107 is shown. System power device 107 may provide a further input terminal $V_{CP}$ which may be the midpoint connection in the series connection of two input capacitors C+, C−. The series connection of two input capacitors C+, C− may be, for example, an input of a multi-level inverter topology implementation of system power device 107. However, input terminal $V_{CP}$ might not necessarily be externally provided, since according to some implementations of system power device 107, a single capacitor connected across terminals V+ and V− along with a switched bridge topology (not shown) included, may provide the inverter topology for system power device 107. According to some features, more than two capacitors may be disposed between terminals V+ and V−. For example, 6 capacitors may be disposed between terminals V+ and V−, creating 5 midpoint voltage levels. Load 109 may be connected to the output of system power device 107. Load 109 may be an AC motor, a transformer, a localized grid and/or a utility grid for example.

The output of converter 110a may be connected to terminal V−, the output of converter 110a may be the same as or similar to as discussed previously above with respect to converter 110 and may be similarly connected to terminals Vc, V+, W and/or X. Converter 110a is shown in FIG. 3A as a boost converter such that the input DC voltage from power supply PS1a is converted to an increased value of output voltage at the output of converter 110a. Power supply PS1a connects across the input terminals of converter 110a. Power supply PS1a is a source of DC voltage that may be provided from a power source 101 connected to power device 103/103a, from a power device 103/103a, from a string of series connected power devices 103/103a and/or from an auxiliary source of DC power (from auxiliary power circuit 162/262 for example) which may be separate from the DC power of power system 180a. Power supply PS1a may be same as any one of the power supplies PS1 to PSn. The converter 110a may be same as any one of the converters 110 connected to PS1-PSn.

A first input terminal of converter 110a connects to a ground and/or earth. A second input terminal of converter 110a connects to a first end of inductor L1. A second end of inductor L1 connects to the anode of diode D1 and a first end of switch Q1. The cathode of D1 connects to a first end of capacitor C1. A second end of switch Q1 and a second end of capacitor C1 connect to the ground and/or earth. The cathode of D1 also connects to a first end of resistor R1. A second end of resistor R1 connects to the anode of diode D2. The cathode of diode D2 connects to a first end of switch Q2. A second end of switch Q2 connects to terminals Z and V− but may also alternatively be connected to $V_{CP}$, V+, W and/or X. Switch Q2 may be an example of switches S1-Sn, SA, SB and SC described above. An appropriate pulse width modulation signal or other control signal may be applied to the gate (g) of switch Q1 to provide the boost function of converter 110a such that the input DC voltage from power supply PS1a is converted to an increased value of output voltage at the output of converter 110a.

Reference is now made again to method 201 of FIG. 2B as applied to power system 180f of FIG. 3A, according to illustrative aspects of the disclosure. Steps of method 201 may be implemented by one of the controllers of system power device 107, power device 103/103a and/or converter 110a. Power system 180f uses one converter and one power supply, and one converter and one power supply may be used with respect to power systems 180a-180e described above and other powers systems described below. At step 203, DC power from power source 101 may be provided and applied to the input of system power device 107 via power device 103/103a or power source 101 may be provided and applied to the input of system power device 107 directly (e.g., where power device 103/103a is not featured). At step 205, DC power (power=voltage x current) from power source 101 directly and/or from power device 103/103a connected to power source 101 may be inverted by system power device 107 to an AC power (power=voltage x current) output that may be applied to load 109. At step 207, an electrical parameter (e.g., voltage, current, power, resistance) may be sensed on terminal V− by a sensor of system device 107, sensors/sensor interfaces 125 of power device 103/103a on terminal Z and/or sensor interface 204/sensors 204a.

At about the same time of step 207, in step 209, the source of DC voltage from power supply PS1a may be converted by converter 110a to provide a greater voltage at the output of converter 110a which is responsive to the electrical parameter sensed in step 207. As such, responsive to the electrical parameter sensed, control of the switching of switch Q1 may be application of an appropriate pulse width modulation signal to the gate (g) of switch Q1. At step 211, the operation of switch Q2 to be 'ON' may add the boosted output voltage of converter 110a to terminal V− of system power device 107. As such, in step 213, the voltage applied to terminal V− is no longer floating but is established above the potential of the ground connection provided by converter 110a. Included in step 213 by operation of the other steps of method 201 is continuous maintenance of the voltage applied to terminal V− above the potential of the ground connection provided by converter 110a.

Where multiple system power devices are connected in parallel as shown with respect to power system 180a, diode D2 and resistor R1 may be utilized as a current limiting device and/or other current limiting circuit to limit circulating currents between converters 110a. Moreover, if the polarity of power supply PS1a is reversed, the output of converter 110a may be applied to terminal V+ such that the steps of method 201 may establish and maintain the voltage applied to terminal V+ to be below the potential of the ground connection provided by converter 110a. Where multiple system power devices are connected in parallel as shown with respect to power system 180a, a single converter 110a may provide the reference voltage to a single system power device, and by virtue of the parallel connection of system power devices 107, each of the parallel-connected power devices 107 may be referenced to the voltage output by converter 110a.

According to features of the disclosure, a power converter 110a may be integrated into a system power device 107. Where a power converter 110a is integrated into each of multiple parallel-connected system power devices 107, each power converter 110a may be synchronized to output a common reference voltage (e.g., by a single system power device being designated as a primary system device and the primary system power device outputting a reference voltage to be used by the other system power devices), or only a single integrated power converter 110a may be configured to output a reference voltage, and the other integrated power converters 110a may be disabled and/or might not output a reference voltage.

Figure 3B:
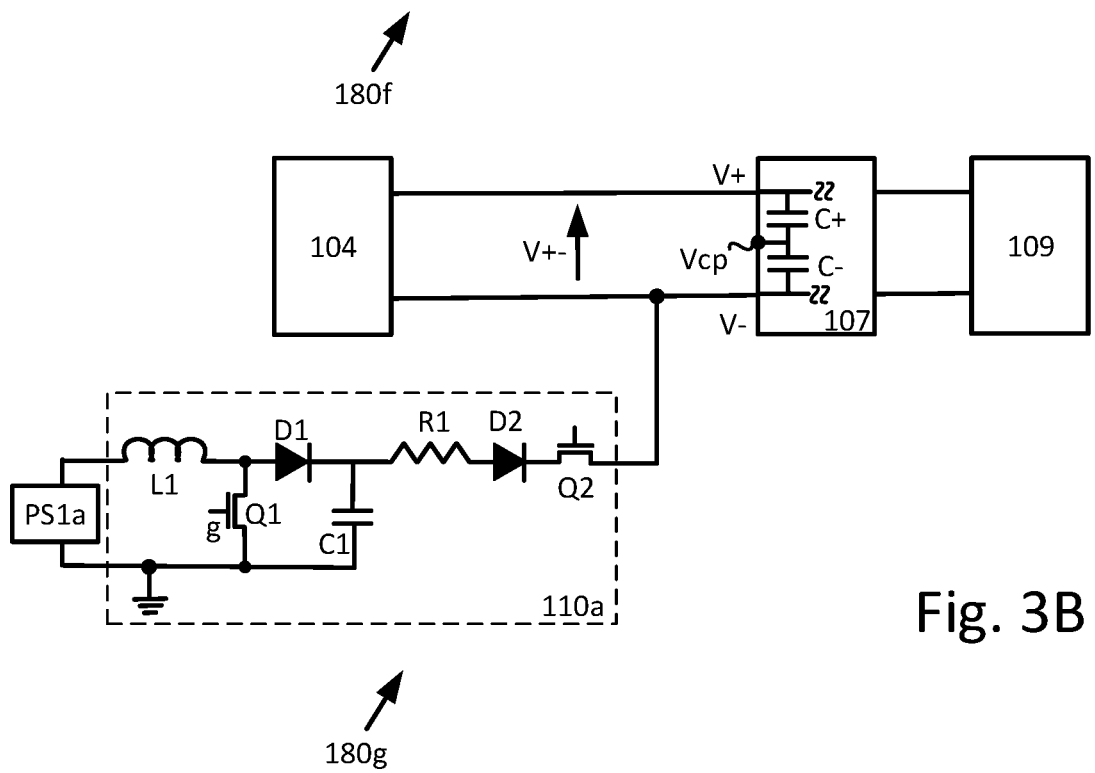
FIG. 3B shows a power system, according to illustrative aspects of the disclosure.

Reference is now made to FIG. 3B which shows a power system 180g, according to illustrative aspects of the disclosure. Power system 180g is similar to power system 180f except that power source 101 and power device 103/103a in power system 180f may be included in power source 104 of power system 180g. Power source 104 may be as described previously with respect to FIG. 1F so that power source 104 may be a variety of power sources such as a battery or batteries, photovoltaic panel(s), DC generator(s) and/or a combination of power source 101 and respective power device 103/103a as shown with respect to power system 180a.

In the description above with respect to step 207 electrical parameters (e.g. voltage, current, power, resistance) may be sensed on terminals V−, $V_{CP}$ and/or V+ by a sensor of system power device 107, by sensors/sensor interfaces 125 of power device 103/103a and/or the sensor interface 204/sensors 204a of converters 110 on terminals W, X, Y, Z, V− and V+. Alternatively, or in addition, electrical parameters (e.g. voltage, current, power, resistance) may be sensed on the AC side of system power device(s) 107 on at least one of the phases of the output of system power device(s) 107 and/or the neutral of system power device(s) 107. As such, where the output of system power device(s) 107 is 3 phase, the average voltage of the three phases may be measured (e.g. by direct measurement, or by calculation) and used in step 213, to ensure that the voltage applied to terminal V− is no longer floating but is established above the potential of the ground connection provided by converters 110/110a. Included in step 213 by operation of the other steps of method 201 may be continuous maintenance of the voltage applied to terminal V− referenced to a desirable voltage point with respect to ground and/or above the potential of the ground connection provided by converters 111/110a.

Figure 4A:
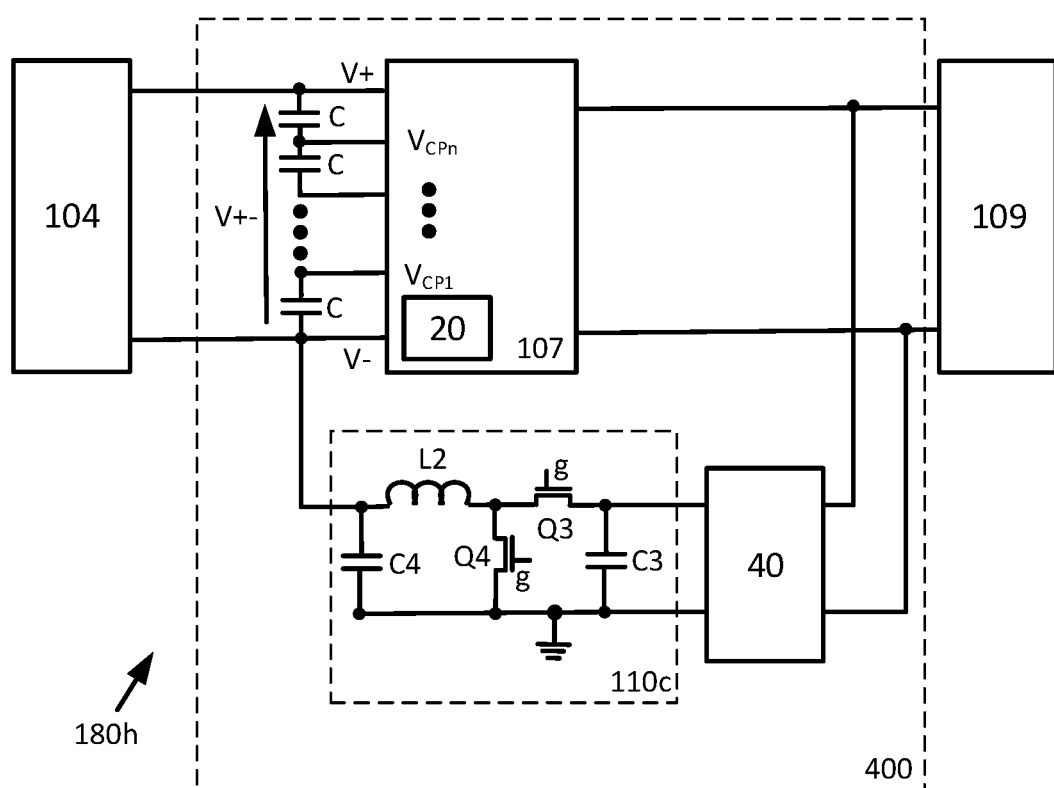
FIG. 4A shows a power system, according to illustrative aspects of the disclosure.

Reference is now made to FIG. 4A which shows a power system 180h, according to illustrative aspects of the disclosure. Power source 104 connects to the input of inverter 400. As discussed previously above, power source 104 may be one or more of a variety of power sources such as batteries, photovoltaic panels, DC generators and/or a combination of power source 101 and respective power device 103/103a as shown with respect to power system 180a. The DC voltage of power source 104 connects to terminals V+ and V− of system power device 107 which may include control unit 20, described above where sensors 204a/sensor interface 204 may be utilized to sense the electrical parameter on terminals V+, V− and on 'n' connection terminals $V_{CP1}$-$V_{CPn}$. The electrical parameter may include voltage (V), current (I) and power (V×I). The 'n' connection terminals may be the midpoint connection in the series connection of input capacitors C. The series connection of multiple input capacitors C may be an input of a multi-level inverter topology implementation of inverter 400 for example. However, input terminals to inverter 400 on system power device 107 may provide a single capacitor C connected across terminals V+ and V− along with a switched bridge topology (not shown) included, which may also provide the inverter topology for inverter 400. According to some features, more than two capacitors C may be disposed between terminals V+ and V−. For example, six capacitors may be disposed between terminals V+ and V−, creating five midpoint voltage levels in addition to the end voltage levels of V+ and V−. One or more of the five midpoint voltage levels and the two-end voltage levels may be measured to provide a reference measurement for regulation and control of a voltage level at one of the midpoint voltage and/or one of the end voltage levels.

Load 109 may be connected to the output of system power device 107. Load 109 may be an AC motor, a transformer, a localized grid and/or a utility grid for example. The output of inverter 400 is shown as a single-phase output but may also be a multiple phase output such as a three-phase output for example. The output of inverter 400 is connected to the input of rectifier unit 40. Rectifier unit 40 may be AC to DC converters such as uncontrolled diode rectifier circuits, phase-controlled rectifiers and/or switched mode power supplies (SMPS). Rectifier 40 may also include a transformer which may be used to galvanically isolate between the AC output of inverter 400/load 109 and the DC input of converter 110b. The transformer may also either increase and/or decrease the AC input to rectifier unit 40.

The DC output of rectifier unit 40 connects across the input of converter 110b. Converter 110b is shown as a buck converter circuit topology. As such since one function of a buck converter may be to reduce the voltage at its input to a lower voltage at its output, a transformer may not be required in rectifier unit 40. Capacitor C3 connects across the input of converter 110b. One input terminals of converter 110b connects to ground and/earth. The other input terminal of converter 110b connects to one end of switch Q3, the other end of switch Q3 connects to inductor L2 and one end of switch Q4. The other end of inductor L2 provides the output of converter 110b and also connects to one end of capacitor C4. The remaining ends of capacitor C4 and switch Q4 connect to ground and/earth. The output of converter 110b is shown connected to terminal V− but may also connect to terminal V+ and/or connection terminals $V_{CP1}$-$V_{CPn}$. The utilization of method 201 for inverter 400 may be to establish and maintain the voltage applied to terminal V− to be above the potential of the ground connection provided by converter 110b or establish and maintain the voltage applied to terminal V− to be below the potential of the ground connection provided by converter 110b if the polarity of the input to converter 110b is reversed for example. In a similar way, inverter 400 may be configured and controlled to establish and maintain the voltage applied to terminal V+ to be above the potential of the ground connection provided by converter 110b or to establish and maintain the voltage applied to terminal V+ to be below the potential of the ground connection provided by converter 110b, if the polarity of the input to converter 110b is reversed for example.

Figure 4B:
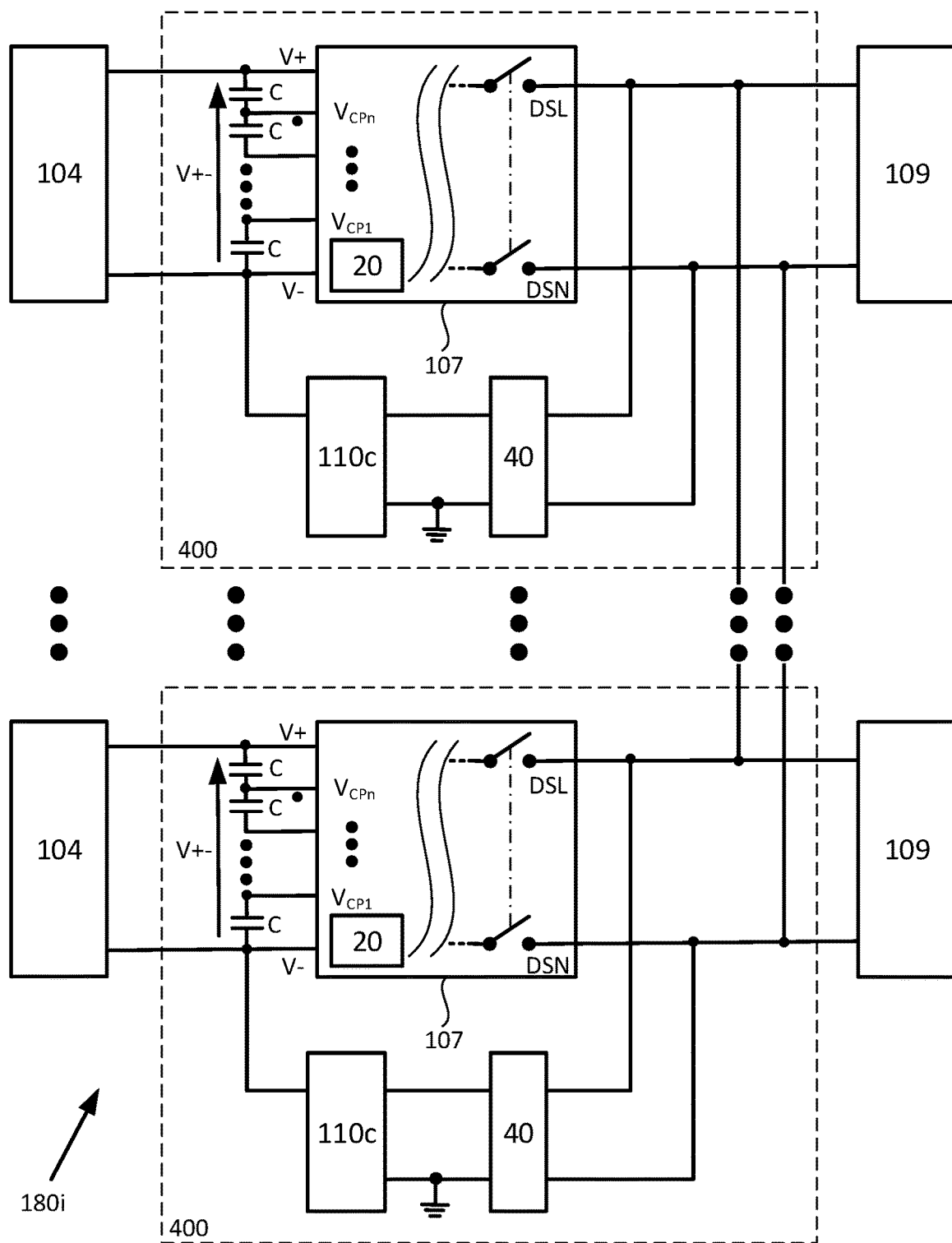
FIG. 4B shows a power system, according to illustrative aspects of the disclosure.

Reference is now made to FIG. 4B, which shows a power system 180i, according to illustrative aspects of the disclosure. Power system 180i is similar to power system 180h but may include multiple inverters 400, each having one or more with multiple inputs from one or more power sources 104 and the output of each inverter 400 connected across a load 109. Further detail of system power device 107 may include control unit 20 and may also include switches DSL and DSN that may disconnect or reconnect respectively the live and neutral outputs of system power device 107 from a load 109. The output of system power device 107 is shown as a single-phase output but may also be a three-phase output. The three-phase output may include at least three switches that may disconnect or reconnect respectively the three live and/or neutral outputs of system power device 107 from load 109. If power sources 104 are photovoltaic generators, switches DSL and DSN may disconnect the live and neutral outputs of system power device 107 from load 109 during nighttime operation of power system 180i. Switches DSL and DSN may reconnect the live and neutral outputs of system power device 107 to load 109 during daytime operation of power system 180i.

Reference is now made again method 201 and to power system 180i when power sources 104 are photovoltaic generators and load 109 is a utility grid. Control units 20 of each inverter 400 may communicate with each other where one control unit 20 may be a primary control unit and other control units 20 are secondary control units. Sensors 204a/sensor interface 204 may be utilized to sense electrical parameters on the live and neutral outputs of system power device 107, terminals V−, $V_{CP1}$-$V_{CPn}$ and V+.

During daytime operation switches DSL and DSN may connect the live and neutral outputs of system power device 107 to load 109. At step 203, DC powers from power sources 104 may be provided and applied to the inputs of system power devices 107.

At step 205, DC power (power=voltage x current) from power sources 104 may be inverted by respective system power devices 107 to an AC power (power=voltage x current) output that may be applied to load 109.

At step 207, electrical parameters (e.g., voltage, current, power, resistance) may be sensed for each inverter 400 on the respective terminals of each system device 107 by each of the sensor interfaces 204/sensors 204a provided by each control unit 20.

At about the same time of step 207, in step 209, during daytime operation, the source of DC voltage from each rectifier unit 40 may be converted by converter 110b to provide voltages at the outputs of each converter 110b that is responsive to the electrical parameters sensed in step 207 for each inverter 400. By way of non-limiting example, one of terminals $V_{CP1}$-$V_{CPn}$ may be chosen as the terminal at which the voltage may be sensed for each inverter. As such, if the input to each system power device 107 has a six-capacitor input, terminal $V_{CP3}$ (the midpoint of the input to each system power device 107) of each inverter 400 may be sensed at step 207 and an appropriate control signal sent to each converter 110b and/or also to power device 103/103a that may be included in power source 104 from the primary control unit 20 so that each terminal $V_{CP3}$ is controlled and maintained (step 213) to have the same desired voltage and terminal V− is no longer floating but is established above the potential of the ground connection provided by each converter 110b. Included in step 213 by operation of the other steps of method 201 may be continuous maintenance of the voltage applied to terminal V− above the potential of the ground connection provided by converter 110b.

By way of non-limiting numerical example, assume that a desirable voltage on terminals V+ is 510 volts (v) and the voltage on terminal V− is substantially above ground (or a "virtual ground") potential (zero volts), +10 v for example. Control unit 20 may be utilized to maintain voltage V+− for each power source 104 of 500 v (510 v-10 v) at step 205 for each inverter 400. Voltage V+− of 500 v is a floating voltage (e.g., voltage V+ might not be directly referenced to ground, rather voltage V+ may be referenced to a "virtual ground", with the "virtual ground" controlled to be at the same voltage as earth but galvanically isolated from earth) but any one of rectifier units 40 and respective converter 110b may be used to set the voltage on terminal V− to be +10 volts and 510 v on terminal V+ by sensing the inverting of each system power device 107 (step 207). Converter 110b for each inverter 400 may be used (step 209) to apply a respective positive voltage (with respect to ground to terminal) to each terminal V− (step 211) via conversion of power from each rectifier unit 40 (step 209) so that each of terminals $V_{CP3}$ may be established and maintained (step 213) at 260 volts. As such, during operation each of the inverters 400, each inverter 400 may have different sensed parameter values needing adjustment from a respective converter 110b to establish and maintain that terminal $V_{CP3}$ of each inverter 400 may be established and maintained (step 213) at the same value (260 volts). For example, for one converter 400, if the voltage on terminal V+ is +250 v and the voltage on terminal V− is −250 v, so that the differential voltage between terminals V− and V+ is 500 v, the output of converter 110b may add 260 v to terminal V− so that by Kirchhoff voltage law the voltage on terminal V− is 260 v-250 v=10 v and the voltage on terminal V+ is 510 v=250 v+260 v.

According to features of the disclosure, each system power device 107 may be controlled to maintain an internal voltage level at a substantially common level. For example, system power devices 107 as shown in FIG. 4B may feature a plurality of input capacitors C, creating a plurality of intermediate voltage levels. One of the intermediate voltage levels may be regulated (e.g. measured at step 207 of method 201 when applied to system power devices 107) to be at a certain voltage level, with the certain voltage level regulated at each system power device 107 substantially the same for all system-connected power devices. This regulation may be useful, for example, to prevent circular current flows between system power devices 107 connected in parallel at input terminal and/or at output terminals. The intermediate voltage point regulated may be an intermediate input voltage (e.g., the voltage Vcp of FIG. 3A) or an intermediate output voltage (e.g., a "virtual neutral" voltage internally created but not output by system power device 107 of FIG. 4B, or, where system power device 107 is designed to output a neutral voltage line, the neutral voltage line may be regulated for each system power device 107 to be at a substantially common voltage level).

Figure 5:
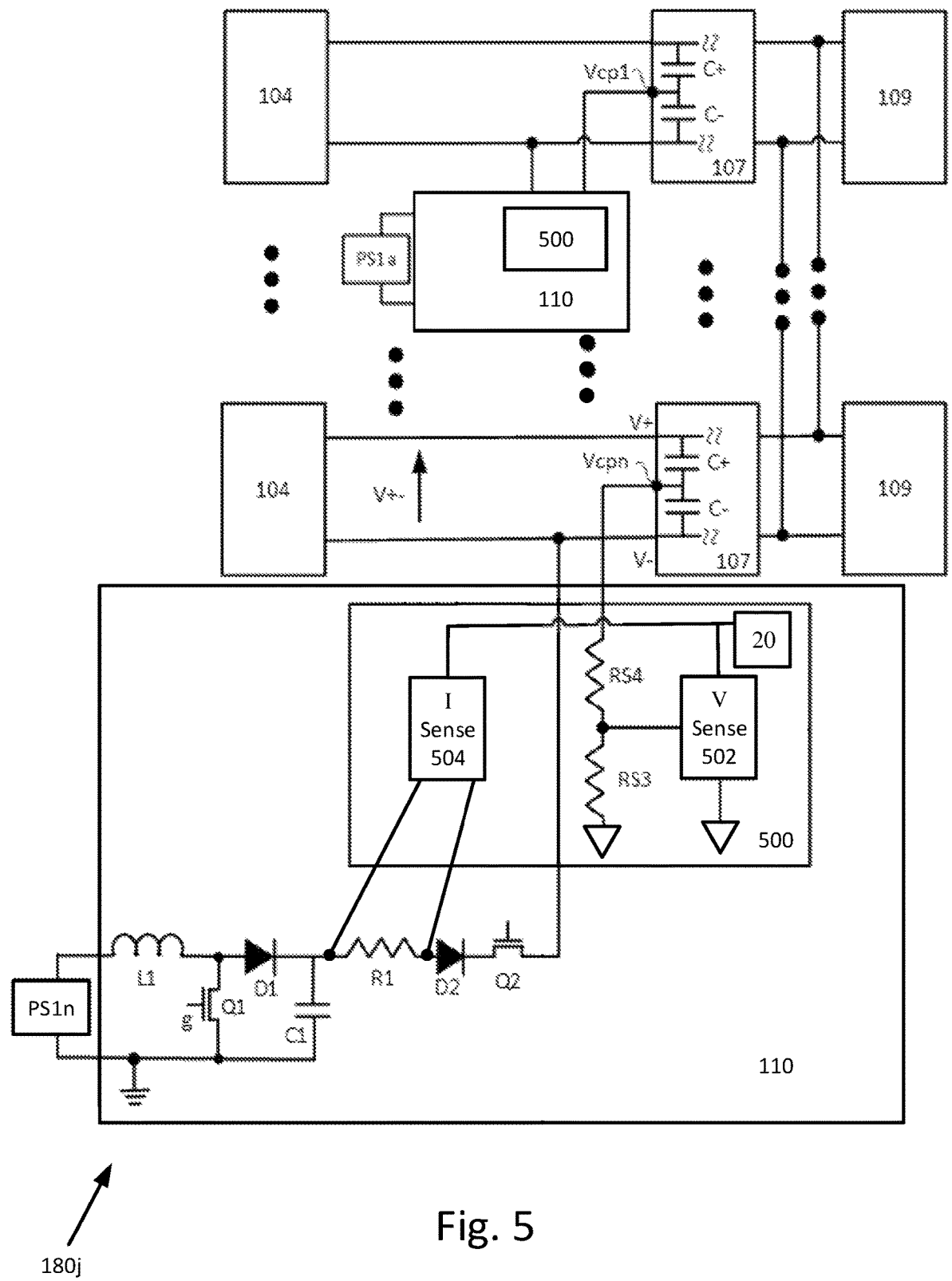
FIG. 5 shows a power system, according to illustrative aspects of the disclosure.

Reference is now made to FIG. 5, which shows a power system 180j, according to illustrative aspects of the disclosure. Converter 110 includes circuitry 500 configured to regulate the output of converter 110. Circuitry 500 may include one or more sensors, for example, current and/or voltage sensors. According to the illustrative circuitry shown in FIG. 5, circuitry 500 includes two resistors RS3, RS4 connected in series between terminal Vcpn and ground and/or earth. A first end of resistor RS4 is connected to terminal Vcpn and a second end of resistor RS4 is connected to a first end of resistor RS3. The second end of resistor RS3 is connected to the ground and/or earth potential. Circuitry 500 also includes a voltage sensor 502. A first end of voltage sensor 502 is connected to the first end of resistor RS3 and a second end of voltage sensor 502 is connected to the ground and/or earth potential. Voltage sensor 502 may also be operatively connected to control unit 20 and/or controller 200. In some examples, voltage sensor 502 may be part of control unit 20. In some examples, control unit 20 may be located in system power device 107 and/or converter 110. As another example, control unit 20 may be a separate unit. Circuitry 500 also includes a current sensor 504 connected in parallel to resistor R1 of converter 101. Current sensor 504 is also operatively connected to control unit 20 and/or controller 200. In some examples, current sensor 504 may derive the current flowing through resistor R1 based on the voltage across resistor R1 and the resistance of resistor R1 (current=voltage÷resistance). In some examples, current sensor 504 may be connected in series with resistor R1 and measure the current flowing through resistor R1 directly.

Circuitry 500 is configured to control the output of converter 110. As mentioned above, in some examples, switch Q1 and/or switch Q2 may be controlled by control unit 20. The control of these switches Q1, Q2 may be based on one or more parameter sensed by the circuitry 500. As an example, the one or more parameter may include: voltage, current, etc. By adjusting control of switches Q1 and/or Q2, control unit 20 may adjust the output of converter 110. For example, increasing a duty cycle of switch Q1 may increase the voltage output by converter 110.

In cases where power system 180j includes a plurality of system power devices 107, it may occur that a voltage at terminal Vcpn for one or more of the system power devices 107 may be greater (e.g., substantially greater) than a target voltage that corresponds to a voltage or a target voltage at terminal Vcpn at one or more other system power devices 107. For example, substantially greater in this context may be within a certain range, e.g., +/− five volts, +/− tens of millivolts, +/− hundreds of millivolts, etc. If the voltage Vcpn is higher at a first system power device than at a second system power device, then the second system power device may be adversely affected, for example, shut down. In such cases, in the absence of circuitry that senses current and regulates the voltage accordingly, then other power devices 107 (e.g., the second system power device which may be operating at or below the desired voltage) may be inadvertently bypassed or deactivated, and only the one or more system power device 107 operating at a voltage greater than the desired voltage may continue to supply power to the load 109. In order to help allay such a scenario, the circuitry 500, in addition to sensing voltage, may also sense current, e.g., the current flowing through the converter 110 at resistor R1. If one or more sensed parameter is indicative of a voltage that is higher than a desired voltage or higher than a voltage operating point of other system power devices 107, then controller 200 may operate in order to decrease the voltage output by the converter 110, which decreases the voltage at terminal Vcpn for that system power device 107.

It will be appreciated that in some examples, a converter 110, which is connected to ground potential, and circuitry 500 may be used to regulate a similar voltage value at a plurality of terminals Vcpn for a plurality of system power devices 107 by regulating and/or directly controlling the voltage at terminal V−, V+, etc. In some cases, for example where terminal Vcpn is a common neutral (or "virtual neutral", i.e., a terminal corresponding to terminals at other system power devices 107 having a similar or identical voltage without directly connecting the Vcpn terminals of the various system power devices 107) for the plurality of system power devices 107, then a single circuit (e.g. circuitry 500) may be used to control the voltage at terminal Vcpn for the plurality of system power devices 107. In some examples, for example, where the power system has a plurality of power supplies PSn and a plurality of system power devices 107 share a common neutral or a common "virtual neutral", in some cases where one or more of the power supplies PSn cease to operate, then the power system may continue to function with one or more of the remaining power supplies PSn providing the required voltage to terminal V−, V+, etc.

Figure 6A:
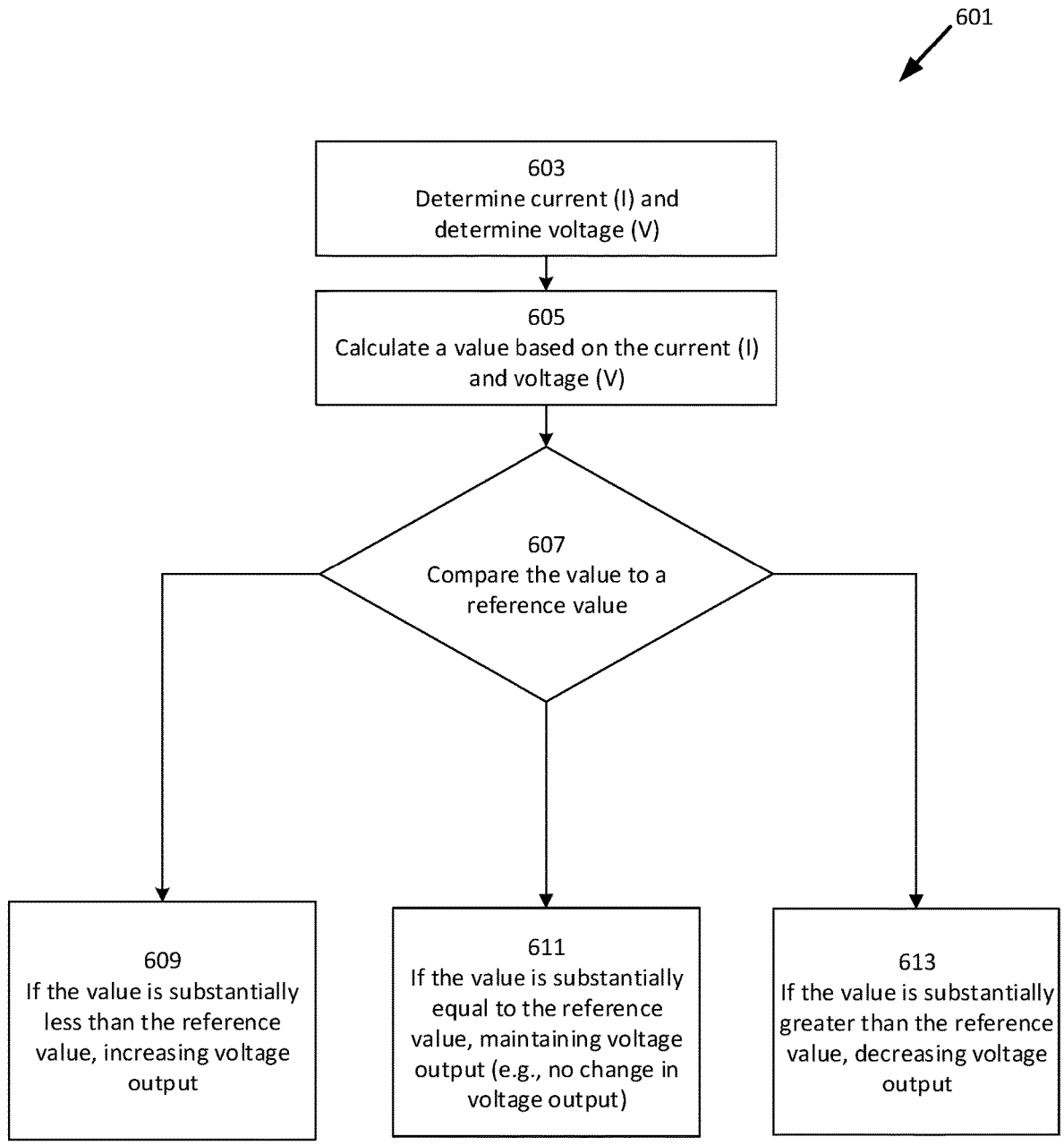
FIG. 6A shows a flowchart of a method, according to illustrative aspects of the disclosure.

Reference is now made to FIG. 6A which shows a flowchart of a method 601 according to illustrative aspects of the disclosure. For example, method 601 may be applied to power system 180j of FIG. 5 in the description that follows. As an example, steps of method 601 may be implemented by controllers of system power devices 107, controllers of power devices 103/103a, and/or converters 110 acting as a primary controller.

At step 603, a current is determined and a voltage is determined.

For example, at step 603, a current related to the voltage at terminal Vcpn of system power device 107 may be determined, e.g., measured by current sensor 504. As an example, the current flowing through resistor R1 may be measured. In other examples, a different current may be measured or determined, for example, the current through diode D1, the current through diode D2, the current through switch Q2, etc. In some examples, the current may be estimated (e.g., by measuring current through inductor L1 and estimating the current through resistor R1 based on the measured current through inductor L1 and the duty cycle of switch Q1).

For example, at step 603, a voltage related to the voltage at terminal Vcpn of system power device 107 may be determined, e.g., measured by voltage sensor 502. As an example, the voltage of resistor RS3 may be measured. The voltage of resistor RS3 is related to the voltage at terminal Vcpn. In some cases the voltage of resistor RS3 that is measured may be used to derive the voltage at terminal Vcpn. In other examples, a different voltage may be sensed, for example, the voltage at terminal V+, the voltage at terminal V−, etc.

At step 605, a value is calculated based on the determined current and the determined voltage. For example the value may be calculated using a function that depends both on the current and the voltage, e.g., a linear function, a polynomial function, etc.

At step 607 the calculated value is compared to a reference value. For example, if the value calculated at step 605 is a voltage value then the reference value may be a reference voltage value. As an example, the reference value may be a desired voltage value, desired current value, etc.

If at step 607 it is determined that the calculated value is substantially less than the reference value, then at step 609 the voltage output may be increased. For example, the control unit 20, e.g., controller 200, may control the converter 110, e.g., switch Q1 and/or switch Q2, to increase the output voltage of the converter 110 that is output to terminal V−. This may control an increase in voltage at terminal Vcpn.

If at step 607 it is determined that the calculated value is substantially equal to the reference value, or within a permissible range of variation from the reference value, then at step 611 the voltage output may be substantially maintained. For example, the control unit 20, e.g., controller 200, may control the converter 110, e.g., switch Q1 and/or switch Q2, to substantially maintain (e.g., allowing a permissible variation, but without a substantial change in average voltage) the output voltage of the converter 110 that is output to terminal V−. This may maintain the voltage at terminal Vcpn.

If at step 607 it is determined that the calculated value is substantially greater than the reference value, then at step 613 the voltage output may be decreased. For example, the control unit 20, e.g., controller 200, may control the converter 110, e.g., switch Q1 and/or switch Q2, to decrease the voltage of the converter 110 that is output to terminal V−. This may control a decrease in voltage at terminal Vcpn.

According to features of the disclosure herein, the value calculated at step 605 may be inversely proportional or directly proportional to the desirable change in output voltage. In the example shown in FIG. 6A, the value being substantially less than the reference value causes an adjustment to increase voltage output. In another example, the value may be calculated such that the value being substantially less than a reference value causes an adjustment to decrease voltage output.

By way of non-limiting example, assuming that the value calculated at step 605 may be calculated using a linear function that depends both on the current and the voltage, e.g., using the equation: $\alpha = \beta*I + \gamma*V$; where a is the calculated value, $\beta$ and $\gamma$ are coefficients (e.g., coefficients that are related to one or more parameter corresponding to elements of the power system, such as, resistance of one or more of the resistors in the power system), I is the determined current, and V is the determined voltage. In cases where the determined current I is relatively high and/or the determined voltage V is relatively high, then as a result the value of a may be relatively high. If a is relatively high then the calculated value a may be considered substantially greater than the reference value, and there may be a decrease in the voltage output. In cases where the determined current I is relatively low and/or the determined voltage V is relatively low, then as a result the value of a may be relatively low. If a is relatively low then the calculated value a may be considered substantially less than the reference value, and there may be an increase in the voltage output.

By way of non-limiting numerical example, if the reference value is, for example, about 1 v, and the determined current I is relatively high, e.g., about 10 mA, then the calculated value a may be about 1.5 v, which is substantially greater than the reference value. As a result, there may be a decrease in the voltage output, and as a result a decrease in the determined current in the power system. If the determined current I is relatively low, e.g., about 5 mA, then the calculated value a may be about 0.5 v, which is substantially less than the reference value. As a result, there may be an increase in the voltage output, and as a result an increase in the determined current in the power system. In this example, if the determined current I is about 7.5 mA, then the calculated value a may be about 1 v, which is substantially equal (e.g., within a predetermined amount, within a measurable tolerance, etc.) to the reference value. As a result, the voltage output may be substantially maintained.

By way of another non-limiting numerical example, if the reference value is, for example, about 0.75 v, and the determined current V is relatively high, e.g., about 1 v, then the calculated value a may be about 1.25 v, which is substantially greater (e.g., more than a predetermined amount, more than a measurable tolerance, etc.) than the reference value.

As a result, there may be a decrease in the voltage output, and as a result a decrease in the determined voltage in the power system. If the determined voltage V is relatively low, e.g., about 0.25 mA, then the calculated value a may be about 0.5 v, which is substantially less (e.g., less than by a predetermined amount, less than by a measurable tolerance, etc.) than the reference value. As a result, there may be an increase in the voltage output, and as a result an increase in the determined voltage in the power system. In this example, if the determined voltage V is about 0.5 v, then the calculated value a may be about 0.75 v, which is substantially equal to the reference value. As a result, the voltage output may be substantially maintained.

Figure 6B:
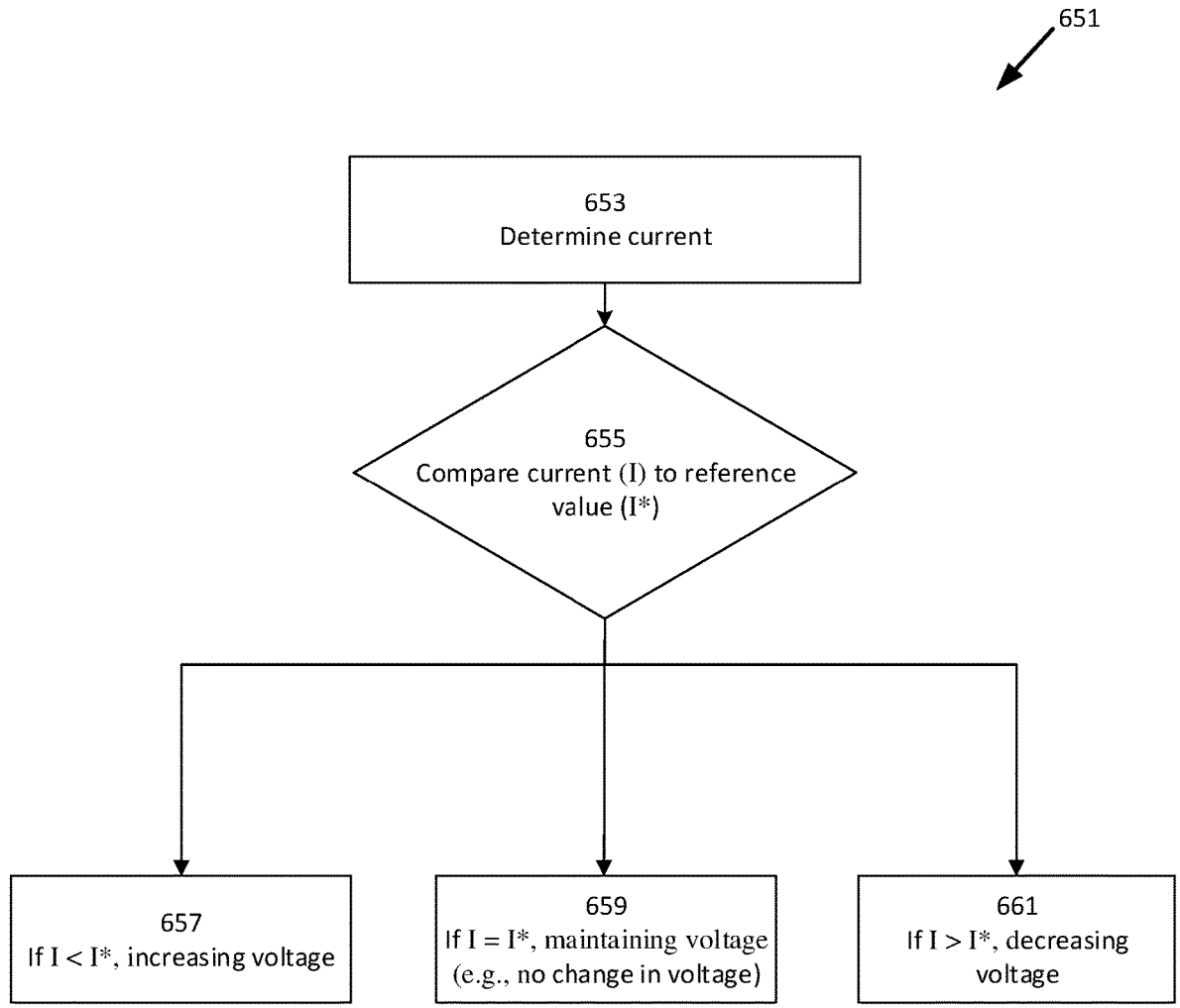
FIG. 6B shows a flowchart of a method, according to illustrative aspects of the disclosure.

Reference is now made to FIG. 6B which shows a flowchart of a method 651 according to illustrative aspects of the disclosure. For example, method 651 may be applied to power system 180j of FIG. 5 in the description that follows. As an example, steps of method 651 may be implemented by controllers of system power devices 107, controllers of power devices 103/103a, and/or converters 110 acting as a primary controller.

At step 653, a current is determined (e.g., sensed).

For example, a current related to the voltage at terminal Vcpn of system power device 107 may be measured, e.g., by current sensor 504. As an example, the current flowing through resistor R1 may be measured. In other examples, a different current may be measured or determined, for example, the current through diode D1, the current through diode D2, the current through switch Q2, etc. In some examples, the current may be estimated (e.g., by measuring current through inductor L1 and estimating the current through resistor R1 based on the measured current through inductor L1 and the duty cycle of switch Q1).

At step 655, the current is compared to a reference current value.

If at step 655 it is determined that the current is substantially less than the reference current, then at step 657 the voltage output may be increased. For example, the control unit 20, e.g., controller 200, may control the converter 110, e.g., switch Q1 and/or switch Q2, to increase the output voltage of the converter 110 that is output to terminal V−. This may control an increase in voltage at terminal Vcpn.

If at step 655 it is determined that the current is substantially equal to the reference current, then at step 659 the voltage output may be maintained. For example, the control unit 20, e.g., controller 200, may control the converter 110, e.g., switch Q1 and/or switch Q2, to substantially maintain the output voltage of the converter 110 that is output to terminal V−. This may maintain the voltage at terminal Vcpn.

If at step 655 it is determined that the calculated value is substantially greater than the reference current, then at step 661 the voltage output may be decreased. For example, the control unit 20, e.g., controller 200, may control the converter 110, e.g., switch Q1 and/or switch Q2, to decrease the voltage of the converter 110 that is output to terminal V−. This may control a decrease in voltage at terminal Vcpn.

According to the present disclosure, a comparison of a calculated and/or sensed value to a desired and/or reference value may be done in order to determine how to regulate a voltage in the power system, e.g., whether or not the output voltage of a converter should be increased, maintained, or decreased.

As another example, it may be determined whether one or more sensed and/or calculated parameter is in a range of desired values in order to determine how the output voltage should be regulated. For example, this range of desired values may be related to a range of voltage values and/or current values that are desired for operation of one or more system power devices 107.

As an example, this range of values may be represented as a look-up table, e.g., stored in control unit 20, that may be used to help determine a target output voltage for the converter, for example, based on a determined current.

As another example, two separate control methods may be used. A first control method may adjust output voltage based on a determined voltage (e.g., measured at terminal Vcp), and a second control method may adjust output voltage based on a determined current (e.g., measured on resistor R1). A controller may alternate between the two control methods, or may run both methods concurrently, for example, the first method may be run at a first frequency, and the second method may be run at a different (higher or lower) frequency, for example, as to not interfere with the first method.

Figure 7:
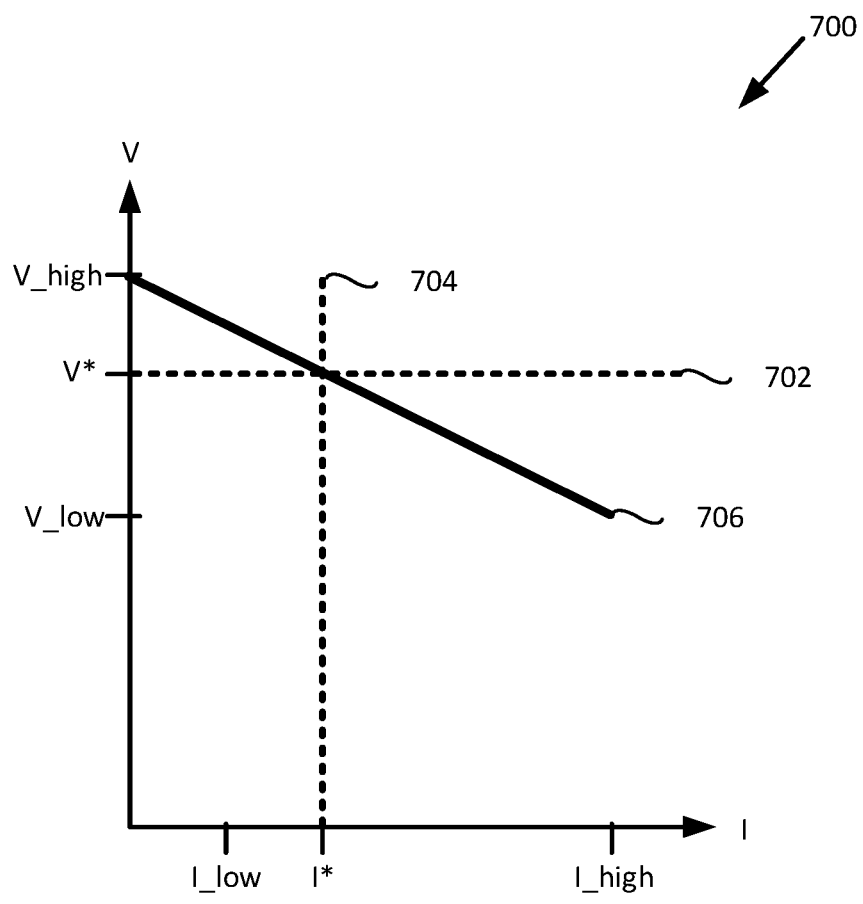
FIG. 7 shows a voltage-current graph, according to illustrative aspects of the disclosure.

Reference is now made to FIG. 7, which shows a voltage-current graph according to illustrative aspects of the disclosure. Graph 700 illustrates a desired voltage value 702 and a desired current value 704. For example, desired voltage value 702 may be a desired voltage at terminal Vcpn, V+, V−, etc. For example, desired current value 704 may be a desired current through resistor R1, or a different current. Graph 700 also illustrates a voltage-current curve 706 indicative of a relationship between current values and voltage values. Voltage-current curve 706, or a section of voltage-current curve 706 may be representative of a range of desired values. As an example, the range of desired values may be determined by a range of desired voltage values, e.g., between a first low voltage, V_low, and a second high voltage, V_high, and/or a range of desired current values, e.g., between a first low current, I_low, and a second high current, I_high. As mentioned above, relationships between current values and voltage values may be included in a look-up table, for example, stored in the control unit 20, e.g., memory 210, and used by the control unit 20, e.g., controller 200, to control the output of the converter 110. For example, the voltage-current curve 706 may be used to help maintain a voltage substantially equal to, or within a certain range of, the desired voltage value 702 at similar terminals, e.g., terminals Vcpn, of a plurality of system power devices 107. For example, based on a current sensed in the converter 110, e.g., a current flowing through resistor R1, the look-up table may be referenced, e.g., by control unit 20 and/or controller 200, and a target output voltage may be determined for regulating the voltage at terminal Vcpn based on the sensed current. This may help ensure that the voltage at one or more of the system power devices 107 does not increase to a point where it would cause one or more other system power devices 107 to be bypassed or deactivated.

By way of non-limiting numerical example, assuming that a desired voltage on terminal Vcpn is 495 volts (v). Circuitry 500 may be utilized to maintain voltage on terminal Vcpn for each system power device 107 of substantially 495 v. If the voltage representative of voltage on terminal Vcpn indicates that the voltage on terminal Vcpn is greater than a desired voltage value and/or range of voltage values, then the voltage that is output by controller 110 may be decreased to a reduced voltage which will decrease the voltage on terminal Vcpn.

Figure 8:
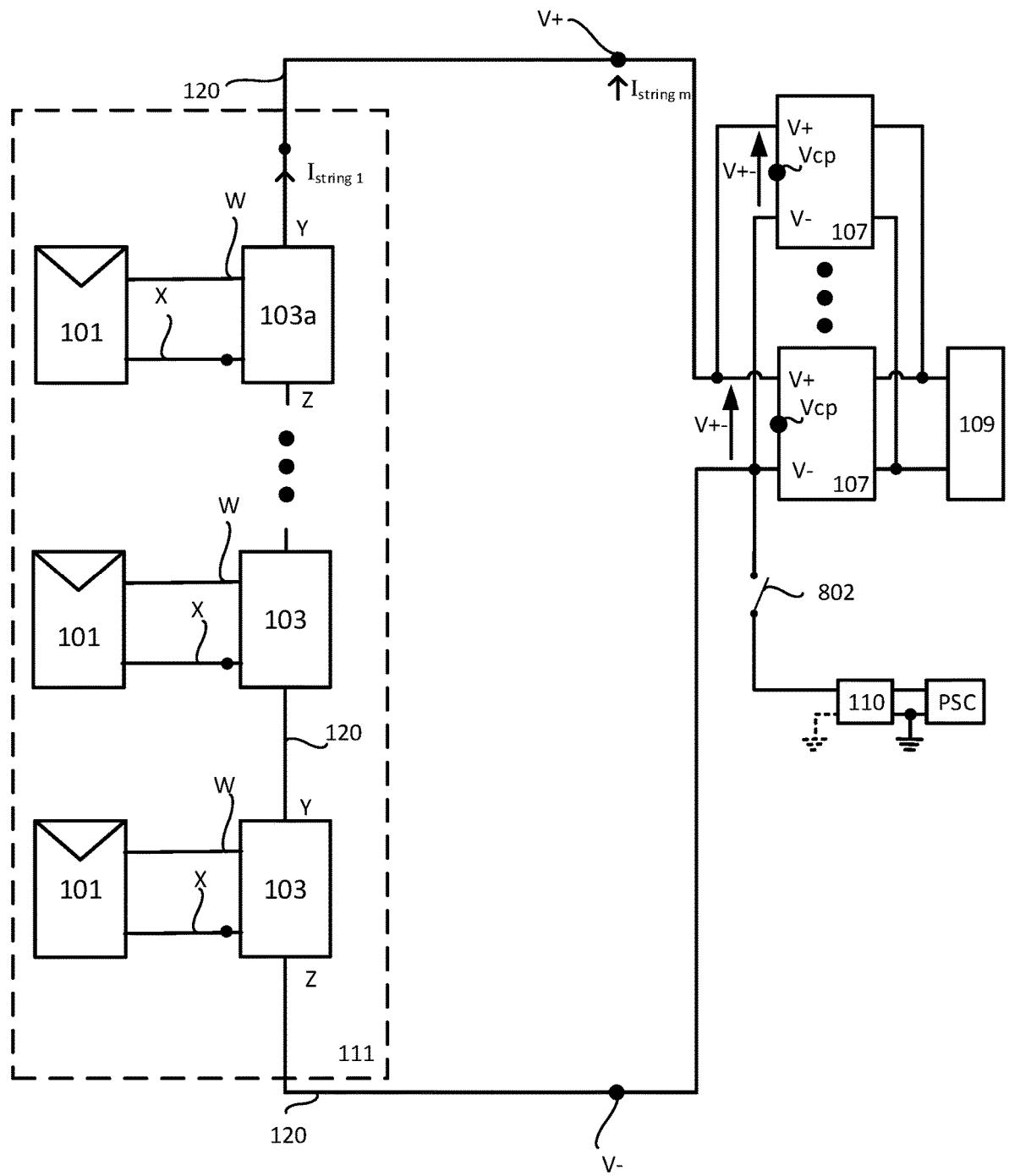
FIG. 8 shows a power system, according to illustrative aspects of the disclosure.

Reference is now made to FIG. 8, which shows a power system 180k, according to illustrative aspects of the disclosure. Power system 180k includes switch 802 which is operable to switch the power system 180k between a daytime mode of operation and a nighttime mode of operation. Switch 802 is connected between converter 110 and terminal V−, with one end of switch 802 connected to an output of converter 110 and a second end of switch 802 connected to terminal V−. In some examples, switch 802 may be switch SC and/or switch Q2 described above. Although illustrated separately, it will be appreciated that switch 802 may be included as part of converter 110 and/or system power device 107. In daytime mode, switch 802 is switched to the OFF position and converter 110 does not provide any output voltage to terminal V−. In nighttime mode, switch 802 is switched to the ON position and a voltage is applied to terminal V− above the potential of the ground connection provided by converter 110. One or more sensors may be used to help determine one or more parameter indicative of whether the switch should be switched to daytime mode or nighttime mode. The one or more sensors may include, for example: a clock, an irradiance sensor, a temperature sensor, a current sensor, a voltage sensor, a power sensor, etc. When one or more parameters from the one or more sensors indicate that the nighttime mode is appropriate, then switch 802 may be activated, e.g., by control unit 20 and/or controller 200. When one or more parameters from the one or more sensors indicate that the daytime mode is appropriate, then switch 802 may be de-activated, e.g., by control unit 20 and/or controller 200. As an example, the one or more parameters can be at least one of: a time value, an irradiance value, a temperature value, a current value, a voltage value, and a power value. Converter 110 may be configured to output a higher voltage when in nighttime mode as compared to daytime mode. For example, converter 110 may be configured to connect to terminal V− of a system power device 107 and to output about 5 v-10 v if operating in daytime operation mode, and to output tens or hundreds of volts if operating in nighttime operation mode, to increase expedite PID reversion (e.g., to expedite discharge of charge stored on solar panels during the daytime).

According to some features, a topology of converter 110 may be selected according to preferred time of operation. For example, a converter 110 designed to operate primarily in daytime mode may be optimized to output a low voltage (e.g., up to tens of volts), and a converter 110 designed to operate primarily in nighttime mode may be optimized to output a higher voltage (e.g., hundreds of volts). Optimization to output a higher voltage may include use of components rated for higher voltages, and/or use of magnetic elements (e.g. a transformer, for example, where converter 110 is a flyback, dual-active bridge, or different type of isolating converter) to increase output voltage. As an example, the voltage applied in a nighttime mode of operation can be in a range of about 100 volts to about 1000 volts, and the voltage applied in a daytime mode of operation can be in a range of about 10 volts to about 150 volts.

In some cases, it might not be possible for power systems to have voltage applied to terminals, e.g., V+, V−, etc., by converter 110 during the day. For example, in some power systems, terminal Vcp might be grounded during the daytime, e.g. while system power device 107 is connected to load 109. In such cases, after the load 109 is disconnected from the system power device 107 at nighttime, then the switch 802 may be activated in order to apply a voltage at terminal V− above the potential of the ground connection provided by converter 110. In such cases, the effects of PID might not be prevented during the daytime, but the effects of PID on the system may be alleviated during the nighttime.

It will be appreciated that, in some cases, a relatively low output voltage may be applied at terminal V− in order to raise the potential at V− to above ground potential, e.g. an output voltage of about 5 v-10 v. In comparison, in some cases, a relatively high output voltage may be applied at terminal V+ in order to raise the potential at V− to above ground potential, e.g. an output voltage of hundreds of volts. Accordingly, an advantage of applying the output voltage at terminal V−, as opposed to terminal V+, may be that a substantially lower, relatively low voltage may be applied by converter 110.

It should be understood that the steps in the flow charts of FIGS. 2B, 6A, and 6B need not all be performed in the order specified and some steps may be omitted, changed in order, or performed simultaneously.

According to one aspect of the presently disclosed subject matter there is provided a method including:
  determining a parameter related to a voltage value at a midpoint terminal of a system power device; and
  adjusting a voltage applied to a second terminal of the system power device based on the parameter and a reference value, wherein the second terminal is different from the midpoint terminal.

In addition to the above features, the method according to this aspect of the presently disclosed subject matter can include one or more of features (i) to (xxiii) listed below, in any desired combination or permutation which is technically possible:

(i) wherein the midpoint terminal is one of a plurality of midpoint terminals of the system power device.
(ii) wherein the midpoint terminal is a terminal inside the system power device.
(iii) wherein the system power device is a direct current (DC) to alternating current (AC) converter comprising a plurality of capacitors connected in series between input terminals of the DC to AC converter; and the midpoint terminal is located between two of the plurality of capacitors.
(iv) wherein the second terminal is an input terminal of the system power device.
(v) wherein the input terminal is a negative voltage input terminal.
(vi) wherein the parameter is a voltage value.
(vii) wherein the parameter is a current value.
(viii) wherein the reference value is a voltage value.
(ix) determining a second parameter related to the voltage value at the midpoint terminal of the system power device; and
adjusting the voltage applied to the second terminal of the system power device based on the second parameter.
(x) wherein the second parameter is a current value.
(xi) wherein the second parameter is a voltage value.
(xii) wherein the current value is related to a current in the converter.
(xiii) determining a third value based on the parameter and the second parameter, and comparing the third value to the reference value.
(xiv) decreasing the voltage applied to the second terminal of the system power device when the parameter is substantially greater than a value related to the reference value.
(xv) increasing the voltage applied to the second terminal of the system power device when the parameter is substantially less than a value related to the reference value.
(xvi) substantially maintaining the voltage applied to the second terminal of the system power device when the parameter is substantially equal to a value related to the reference value.
(xvii) determining a parameter related to a nighttime mode of operation; and
applying the voltage to the second terminal of the system power device based on the parameter related to the nighttime mode of operation
(xviii) a sensor configured to determine a parameter related to a nighttime mode of operation; and the converter is configured to apply the voltage to the second terminal of the system power device based on the parameter related to the nighttime mode of operation.
(xix) wherein the voltage applied to the second terminal of the system power device in the nighttime mode of operation is greater than a voltage applied to the second terminal of the system power device in a daytime mode of operation.
(xx) switching between the nighttime mode of operation and the daytime mode of operation based on the parameter related to the nighttime mode of operation.
(xxi) wherein the parameter is at least one of: a time value, an irradiance value, a temperature value, a current value, a voltage value, and a power value.
(xxii) wherein the voltage applied in the nighttime mode is in a range of about 100 volts to about 1000 volts.
(xxiii) wherein the voltage applied in the daytime mode is in a range of about 10 volts to about 150 volts.

According to another aspect of the presently disclosed subject matter there is provided a device (e.g., an apparatus) including:
a sensor configured to determine a parameter related to a voltage value at a midpoint terminal of a system power device; and
a converter configured to adjust a voltage applied to a second terminal of the system power device based on the parameter and a reference value, wherein the second terminal is different from the midpoint terminal.

This aspect of the disclosed subject matter can optionally include one or more of features (i) to (xxiii) listed above, mutatis mutandis, in any desired combination or permutation which is technically possible According to another aspect of the presently disclosed subject matter there is provided a system including:
a sensor configured to determine a parameter related to a voltage value at a midpoint terminal of a system power device; and
a converter configured to adjust a voltage applied to a second terminal of the system power device based on the parameter and a reference value, wherein the second terminal is different from the midpoint terminal.

This aspect of the disclosed subject matter can optionally include one or more of features (i) to (xxiii) listed above, mutatis mutandis, in any desired combination or permutation which is technically possible According to another aspect of the presently disclosed subject matter there is provided a method including:
determining a parameter related to a nighttime mode of operation; and
applying a voltage to a terminal of a system power device based on the parameter related to the nighttime mode of operation.

According to another aspect of the presently disclosed subject matter there is provided a device including:
a converter configured to apply a voltage to a terminal of a system power device when the device is in a nighttime mode of operation;
a sensor configured to determine a parameter related to the nighttime mode of operation; and
a switch configured to switch between the nighttime mode of operation and a daytime mode of operation based on the parameter related to the nighttime mode of operation.

According to another aspect of the presently disclosed subject matter there is provided a system including:
a converter configured to apply a voltage to a terminal of a system power device when the system is in a nighttime mode of operation;
a sensor configured to determine a parameter related to the nighttime mode of operation; and
a switch configured to switch between the nighttime mode of operation and a daytime mode of operation based on the parameter related to the nighttime mode of operation.

It may be noted that various connections are set forth between elements herein. These connections are described in general and, unless specified otherwise, may be direct or indirect; this specification may be not intended to be limiting in this respect. Further, elements of one feature may be combined with elements from other features in appropriate combinations or sub-combinations.

All optional and preferred features and modifications of the described features and dependent claims are usable in all aspects taught herein. Furthermore, the individual features of the dependent claims, as well as all optional and preferred features and modifications of the described features are combinable and interchangeable with one another.

The invention claimed is:

1. A method comprising:
using a first control method to adjust voltage applied to a first terminal of a system power device, the first control method comprising:
determining current related to a second terminal of the system power device wherein the second terminal is a connection point between two capacitors;
comparing the determined current to a reference current value;
based on the comparing indicating that the determined current is less than the reference current value, increasing the voltage applied to the first terminal of the system power device; and
based on the comparing indicating that the determined current is greater than the reference current value, decreasing the voltage applied to the first terminal of the system power device.

2. The method of claim 1, further comprising:
using a second control method to adjust the voltage applied to the first terminal of the system power device, the second control method comprising:
determining voltage related to the second terminal of the system power device;
comparing the determined voltage to a reference voltage value;
based on the comparing indicating that the determined voltage is less than the reference voltage value, increasing the voltage applied to the first terminal of the system power device; and
based on the comparing indicating that the determined voltage is greater than the reference voltage value, decreasing the voltage applied to the first terminal of the system power device.

3. The method of claim 2, further comprising alternating between the first control method and the second control method.

4. The method of claim 2, further comprising performing the first control method and the second control method concurrently.

5. The method of claim 2, further comprising performing the first control method at a first frequency and performing the second control method at a second frequency.

6. The method of claim 5, wherein the first frequency is greater than the second frequency.

7. The method of claim 5, wherein the second frequency is greater than the first frequency.

8. The method of claim 1, wherein the first terminal is an input terminal of the system power device.

9. The method of claim 1, wherein the determining the current related to the second terminal of the system power device includes measuring or estimating current in circuitry configured to apply voltage to the first terminal.

10. An apparatus comprising:
a controller circuit configured to operate in a first mode to adjust voltage applied to a first terminal of a system power device, the controller circuit, in the first mode, configured to:
determine current related to a second terminal of the system power device, wherein the second terminal is a connection point between two capacitors;
compare the determined current to a reference current value;
based on the comparison indicating that the determined current is less than the reference current value, increase the voltage applied to the first terminal of the system power device; and
based on the comparison indicating that the determined current is greater than the reference current value, decrease the voltage applied to the first terminal of the system power device.

11. The apparatus of claim 10, wherein the controller circuit is further configured to operate in a second mode to adjust the voltage applied to the first terminal of the system power device, the controller circuit, in the second mode, configured to:
determine voltage related to the second terminal of the system power device;
compare the determined voltage to a reference voltage value;
based on the comparison indicating the determined voltage is less than the reference voltage value, increase the voltage applied to the first terminal of the system power device; and
based on the comparison indicating the determined voltage is greater than the reference voltage value, decrease the voltage applied to the first terminal of the system power device.

12. The apparatus of claim 11, wherein the controller circuit is further configured to alternate between the first mode and the second mode.

13. The apparatus of claim 11, wherein the controller circuit is further configured to operate in the first mode and the second mode concurrently.

14. The apparatus of claim 11, wherein the controller circuit is further configured to operate in the first mode at a first frequency and operate the second mode at a second frequency.

15. The apparatus of claim 14, wherein the first frequency is greater than the second frequency.

16. The apparatus of claim 14, wherein the second frequency is greater than the first frequency.

17. The apparatus of claim 10, wherein the first terminal is an input terminal of the system power device.

18. The apparatus of claim 10, wherein the controller circuit is configured to determine the current related to the second terminal of the system power device by measuring or estimating current in circuitry configured to apply voltage to the first terminal.

19. A method comprising:
performing a first control method at a first frequency to adjust voltage applied to a first terminal of a system power device, the first control method comprising:
determining current related to a second terminal of the system power device;
comparing the determined current to a reference current value;
based on the comparing indicating that the determined current is less than the reference current value, increasing the voltage applied to the first terminal of the system power device; and
based on the comparing indicating that the determined current is greater than the reference current value, decreasing the voltage applied to the first terminal of the system power device; and
performing a second control method at a second frequency to adjust the voltage applied to the first terminal of the system power device, the second control method comprising:
determining voltage related to the second terminal of the system power device;
comparing the determined voltage to a reference voltage value;
based on the comparing indicating that the determined voltage is less than the reference voltage value, increasing the voltage applied to the first terminal of the system power device; and
based on the comparing indicating that the determined voltage is greater than the reference voltage value, decreasing the voltage applied to the first terminal of the system power device.

20. An apparatus comprising:
a controller circuit configured to:
operate in a first mode at a first frequency to adjust voltage applied to a first terminal of a system power device, the controller circuit, in the first mode, configured to:
determine current related to a second terminal of the system power device;
compare the determined current to a reference current value;
based on the comparison indicating that the determined current is less than the reference current value, increase the voltage applied to the first terminal of the system power device; and
based on the comparison indicating that the determined current is greater than the reference current value, decrease the voltage applied to the first terminal of the system power device; and
operate in a second mode at a second frequency to adjust the voltage applied to the first terminal of the system power device, the controller circuit, in the second mode, configured to:
determine voltage related to the second terminal of the system power device;
compare the determined voltage to a reference voltage value;
based on the comparison indicating that the determined voltage is less than the reference voltage value, increase the voltage applied to the first terminal of the system power device; and
based on the comparison indicating that the determined voltage is greater than the reference voltage value, decrease the voltage applied to the first terminal of the system power device.

* * * * *